United States Patent
Xiang et al.

(10) Patent No.: US 12,429,966 B2
(45) Date of Patent: Sep. 30, 2025

(54) DISPLAY SUBSTRATE WITH GRID CATHODE LAYER AND TOUCH CONTROL DISPLAY DEVICE WITH DISPLAY SUBSTRATE

(71) Applicant: BOE TECHNOLOGY GROUP CO., LTD., Beijing (CN)

(72) Inventors: Dalin Xiang, Beijing (CN); Meizhu Zheng, Beijing (CN); Yuanyuan Li, Beijing (CN); Zewen Bo, Beijing (CN); Jiuzhen Wang, Beijing (CN); Lina Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/258,486

(22) PCT Filed: Jul. 4, 2022

(86) PCT No.: PCT/CN2022/103619
§ 371 (c)(1),
(2) Date: Jun. 20, 2023

(87) PCT Pub. No.: WO2023/280099
PCT Pub. Date: Jan. 12, 2023

(65) Prior Publication Data
US 2024/0019952 A1 Jan. 18, 2024

(30) Foreign Application Priority Data
Jul. 6, 2021 (CN) .......................... 202110762032.5

(51) Int. Cl.
*G06F 3/041* (2006.01)
*G09G 3/32* (2016.01)

(52) U.S. Cl.
CPC ............. *G06F 3/0412* (2013.01); *G09G 3/32* (2013.01)

(58) Field of Classification Search
CPC ..................................................... G06F 3/0412
See application file for complete search history.

(56) References Cited

U.S. PATENT DOCUMENTS

2016/0370940 A1    12/2016  Zhao
2018/0284505 A1*  10/2018  Ye .......................... G02F 1/1343
(Continued)

FOREIGN PATENT DOCUMENTS

CN          104199573 B    5/2017
CN          106981585 A    7/2017
(Continued)

OTHER PUBLICATIONS

Machine translation CN113066943A (Year: 2025).*

*Primary Examiner* — Gustavo Polo
(74) *Attorney, Agent, or Firm* — BROOKS KUSHMAN P.C.

(57) ABSTRACT

A display substrate and a touch-control display device are disclosed. The display substrate comprises pixel units arranged in an array on a base substrate, signal lines, and a grid-shaped cathode layer; a sub-pixel in the pixel unit comprises a pixel opening area; the cathode layer comprises first cathode patterns and a second cathode patterns, the first cathode patterns are arranged in an array, and adjacent first cathode patterns are coupled via at least one second cathode pattern; an orthographic projection of the first cathode pattern onto the base substrate covers each pixel opening area in a corresponding pixel unit; an orthographic projection of the second cathode pattern onto the base substrate at least partially overlaps with an orthographic projection of at least part of the signal lines onto the base substrate.

18 Claims, 14 Drawing Sheets

(56) References Cited

U.S. PATENT DOCUMENTS

| | | |
|---|---|---|
| 2019/0067390 A1 | 2/2019 | Gao |
| 2022/0102466 A1 | 3/2022 | Qiu et al. |

FOREIGN PATENT DOCUMENTS

| | | |
|---|---|---|
| CN | 110413142 A | 11/2019 |
| CN | 211150599 U | 7/2020 |
| CN | 112151696 A | 12/2020 |
| CN | 113066943 A | 7/2021 |

* cited by examiner

DISPLAY SUBSTRATE WITH GRID CATHODE LAYER AND TOUCH CONTROL DISPLAY DEVICE WITH DISPLAY SUBSTRATE

CROSS-REFERENCE TO RELATED APPLICATIONS

This application is the U.S. national phase of PCT Application No. PCT/CN2022/103619 filed on Jul. 4, 2022, which claims priority to Chinese Patent Application No. 202110762032.5 filed on Jul. 6, 2021, which are incorporated herein by reference in their entireties.

TECHNICAL FIELD

The present disclosure relates to the technical field of touch-control displaying, and more particularly, to a display substrate and a touch-control display device.

BACKGROUND

With the continuous developing of touch-control displaying technology, a thickness of a touch-control display screen becomes much thinner, and the distance between a touch-control electrode in the touch-control display screen and a back panel driving circuit in a display panel becomes much closer. In a capacitive touch-control display screen, a touch-control signal transmitted by a touch-control electrode may be easily affected by a back panel driving circuit, especially when a row inversion pattern is displayed. For example, in a case where a zebra picture (comprising several lines of black and several lines of white) is displayed, data signals for each column simultaneously jumps up or down, and a jump voltage of the data signal is coupled to a touch-control electrode through a cathode, resulting in a distortion of the touch-control signal transmitted by the touch-control electrode. Furthermore, as the touch-control display screen is thinned, the distance between the touch-control electrode and the cathode becomes smaller, and the load of the touch-control electrode increases, resulting in an increase in an attenuation of the signal and a decrease in an amount of sensing the touch-control signal, thus resulting in a poor touch-control effect.

SUMMARY

The present disclosure is to provide a display substrate and a touch-control display device.

To achieve this, the present disclosure provides the following technical solutions.

In a first aspect of the present disclosure, a display substrate is provided, which includes: a base substrate and a plurality of pixel units arranged in an array on the base substrate; the pixel unit includes at least one sub-pixel, and the sub-pixel includes a pixel opening area; the display substrate further includes:
  a plurality of signal lines, the signal line being arranged on the base substrate, the signal lines being configured to provide a signal for a corresponding sub-pixel; and
  a grid-shaped cathode layer, where the cathode layer includes a plurality of first cathode patterns and a plurality of second cathode patterns, the plurality of first cathode patterns is arranged in an array, and adjacent first cathode patterns are coupled via at least one second cathode pattern; an orthographic projection of the first cathode pattern onto the base substrate covers each pixel opening area in a corresponding pixel unit; an orthographic projection of the second cathode pattern onto the base substrate at least partially overlaps with an orthographic projection of at least part of the plurality of signal lines onto the base substrate.

Optionally, the orthographic projection of the first cathode pattern onto the base substrate at least partially overlaps with the orthographic projection of the at least part of the plurality of signal lines onto the base substrate.

Optionally, the plurality of second cathode patterns include a plurality of first sub-patterns, and adjacent first cathode patterns arranged in a first direction are coupled via at least one first sub-pattern; and
  the plurality of signal lines include a plurality of data lines, the data line includes a first data portion and a second data portion alternately arranged in a first direction, an orthographic projection of the first data portion onto the base substrate at least partially overlaps with an orthographic projection of a corresponding first cathode pattern onto the base substrate, and an orthographic projection of the second data portion onto the base substrate at least partially overlaps with an orthographic projection of a corresponding first sub-pattern onto the base substrate.

Optionally, the plurality of pixel units include a plurality of columns of pixel units, each column of pixel units includes a plurality of pixel units arranged along the first direction, each column of pixel units includes at least one column of sub-pixels, and each column of sub-pixels includes a plurality of sub-pixels arranged along the first direction; the at least one column of sub-pixels correspond to the plurality of data lines on a one-to-one basis, and sub-pixels in a same column of sub-pixels multiplex a corresponding data line; and
  the first data portion is coupled to a corresponding sub-pixel, and the second data portion is coupled to an adjacent first data portion in the first direction.

Optionally, the adjacent first cathode patterns arranged in the first direction are coupled via one first sub-pattern; and
  each column of pixel units includes at least two columns of sub-pixels; in at least two data lines corresponding to the at least two columns of sub-pixels, second data portions, which are located at a same row in a second direction, at least partially overlap with an orthographic projection of the same one first sub-pattern onto the base substrate, the second direction intersects with the first direction.

Optionally, the adjacent first cathode patterns arranged in the first direction are coupled via at least two of the first sub-patterns, the at least two of the first sub-patterns are arranged in a second direction, the second direction intersects with the first direction; and
  each column of pixel units includes at least two columns of sub-pixels; in at least two data lines corresponding to the at least two columns of sub-pixels, second data portions correspond to the first sub-pattern on a one-to-one basis, and the orthographic projection of the second data portion onto the base substrate at least partially overlaps with an orthographic projection of a corresponding first sub-pattern onto the base substrate.

Optionally, the plurality of second cathode patterns includes a plurality of second sub-patterns, and adjacent first cathode patterns arranged in a second direction are coupled via at least one second sub-pattern; and
  the plurality of signal lines includes a plurality of scanning lines, the scanning line includes a first scanning portion and a second scanning portion which are alternately arranged along the second direction, an orthographic projection of the first scanning portion onto the base substrate at least partially overlaps with an orthographic projection of a corresponding first cathode pattern onto the base substrate, and an orthographic projection of the second scanning portion onto the base substrate at least partially overlaps with an orthographic projection of a corresponding second sub-pattern on the base substrate.

Optionally, the scanning line includes one or more of: a gate line, a reset signal line or a light-emitting control signal line.

Optionally, the plurality of pixel units include a plurality of rows of pixel units, each row of pixel units includes multiple pixel units arranged along the second direction, each row of pixel units includes at least one row of sub-pixels, and each row of sub-pixels includes a plurality of sub-pixels arranged along the second direction; the at least one row of sub-pixels correspond to the plurality of scanning lines on a one-to-one basis, and sub-pixels in a same row of sub-pixels multiplex a corresponding scanning line; and the first scanning portion is coupled to a corresponding sub-pixel, and the second scanning portion is coupled to an adjacent first scanning portion in the second direction.

Optionally, the adjacent first cathode patterns arranged in a second direction are coupled via one second sub-pattern; and each row of pixel units includes at least two rows of sub-pixels; in at least two scanning lines corresponding to the at least two rows of sub-pixels, second scanning portions, which are located at a same column in the first direction, at least partially overlaps with an orthographic projection of the same one second sub-pattern onto the base substrate, and the second direction intersects with the first direction.

Optionally, in the second direction, a width of the first sub-pattern is less than a width of the first cathode pattern; and/or in the first direction, a width of the second sub-pattern is smaller than the width of the first cathode pattern.

Optionally, the display substrate further includes a grid-shaped negative power signal line, at least a part of the negative power signal line is located between the cathode layer and the base substrate, the negative power signal line is coupled to the cathode layer.

Based on the technical solution of the display substrate as described above, in a second aspect of the present disclosure, a touch-control display device is provided, including the display substrate as described above; the touch-control display device further includes:

a touch-control layer, where the touch-control layer is located at a side of the cathode layer of the display substrate facing away from the base substrate of the display substrate, the touch-control layer includes touch-control electrodes distributed in an array, and the touch-control electrodes are arranged in a grid.

Optionally, an orthographic projection of the touch-control electrode onto the base substrate does not overlap the orthographic projection of the first cathode pattern in the cathode layer onto the base substrate.

Optionally, the touch-control electrode includes a plurality of first touch-control portions and a plurality of second touch-control portions, at least a part of the first touch-control portions extends in a first direction and at least a part of the second touch-control portion extends in a second direction, the first direction intersects with the second direction.

Optionally, a minimum distance L1 between the orthographic projection of the first cathode pattern onto the base substrate and an orthographic projection of a first touch-control portion adjacent to the first cathode pattern onto the base substrate satisfies: $L1 \geq 0.5 \times d1$, where d1 is a width of the first touch-control portion; and/or a minimum distance L2 between the orthographic projection of the first cathode pattern onto the base substrate and an orthographic projection of a second touch-control portion adjacent to the first cathode pattern onto the base substrate satisfies: $L2 \geq 0.5 \times d2$, where d2 is a width of the second touch-control portion.

Optionally, an orthographic projection of the first touch-control portion onto the base substrate does not overlap with an orthographic projection of a data line in the display substrate onto the base substrate.

Optionally, an orthographic projection of the second touch-control portion onto the base substrate does not overlap with an orthographic projection of a scanning line in the display substrate onto the base substrate.

Optionally, the touch-control display device includes a first area and a second area;

an orthographic projection of the cathode layer onto the base substrate is located within an orthographic projection of the first area onto the base substrate; and a layout density for first touch-control portions and second touch-control portions in the first area is less than a layout density for first touch-control portions and second touch-control portions in the second area.

Optionally, the touch-control display device includes a transparent touch-control display device.

BRIEF DESCRIPTION OF THE DRAWINGS

The drawings described here are used to provide a further understanding of the present disclosure, and constitute a part of the present disclosure. Illustrative embodiments of the present disclosure and descriptions thereof are used to explain the present disclosure, and do not constitute improper limitations to the present disclosure. In the drawings.

DETAILED DESCRIPTION

Figure 1:
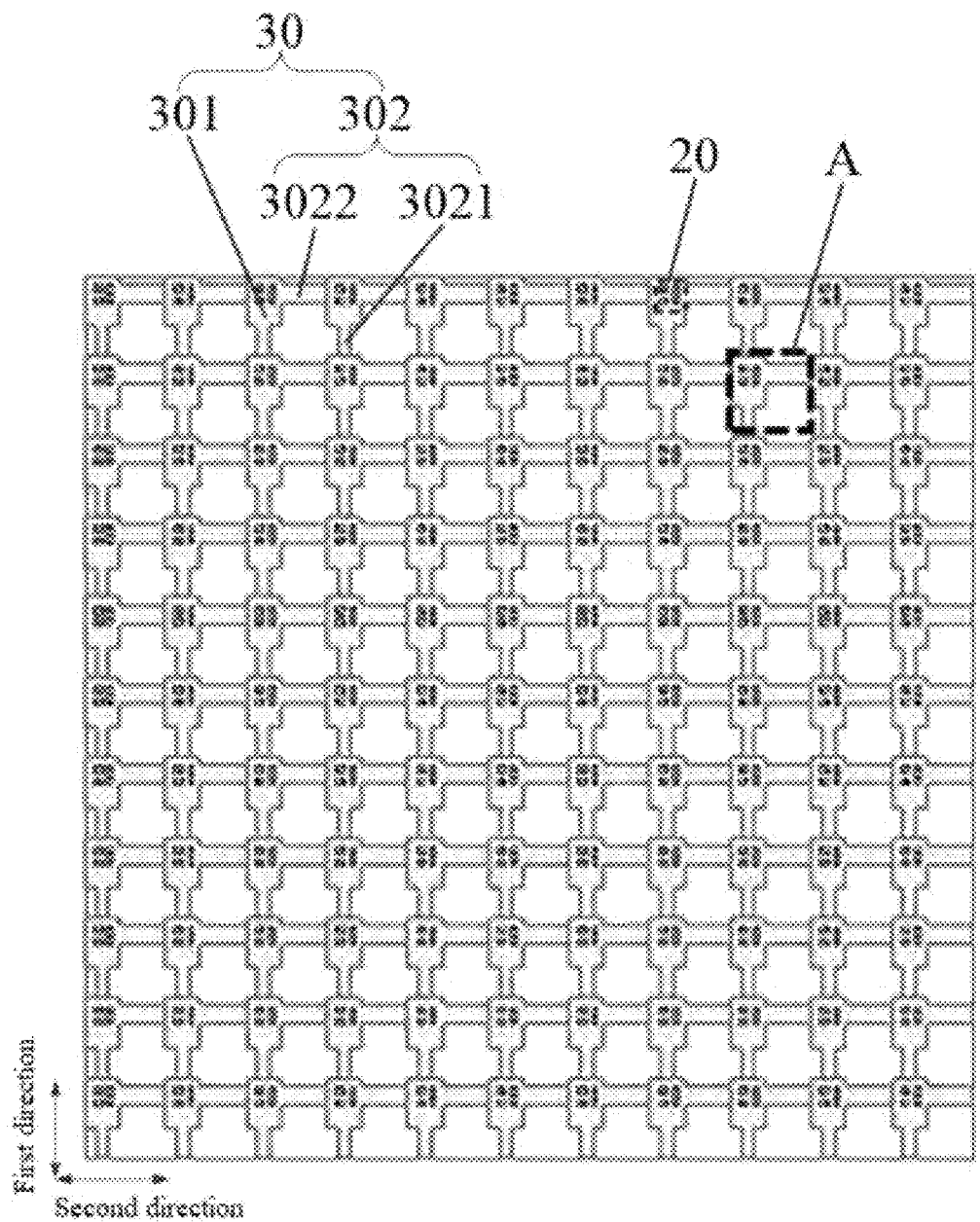
FIG. 1 is a schematic diagram of a first layout of a cathode layer and pixel units provided in an embodiment of the present disclosure.

In order to further explain the display substrate and the touch-control display device provided by embodiments of the present disclosure, a detailed description will be given below with reference to the accompanying drawings.

With reference to FIGS. 1-5, 7, 8, 10, 12 and 14-16, embodiments of the present disclosure provides a display substrate. The display substrate includes: a base substrate 70 and a plurality of pixel units 20 arranged in an array on the base substrate 70. The pixel unit 20 includes at least one sub-pixel (such as a red sub-pixel R, a green sub-pixel G and a blue sub-pixel B), and the sub-pixel includes a pixel opening area. The display substrate further includes:

a plurality of signal lines 40 (such as a data line Data and a scanning line 401), where the signal lines 40 are arranged on the base substrate 70, and the signal lines 40 are configured to provide a signal for a corresponding sub-pixel; and a grid-shaped cathode layer 30, where the cathode layer 30 includes a plurality of first cathode patterns 301 and a plurality of second cathode patterns 302, the plurality of first cathode patterns 301 is arranged in an array, and adjacent first cathode patterns 301 are coupled via at least one second cathode pattern 302; an orthographic projection of the first cathode pattern 301 onto the base substrate 70 covers each of pixel opening areas in a corresponding pixel unit 20; an orthographic projection of the second cathode pattern 302 onto the base substrate 70 at least partially overlaps with an orthographic projection of at least part of the signal lines 40 onto the base substrate 70.

Illustratively, the plurality of pixel units 20 is arranged in an array on the base substrate 70, each pixel unit 20 includes a plurality of sub-pixels, each sub-pixel includes a pixel opening area. The pixel opening area is defined by a pixel defining layer in the display substrate, and is an effective light emitting area of a sub-pixel.

Illustratively, the pixel unit 20 includes a red sub-pixel R, a green sub-pixel G and a blue sub-pixel B, each of sub-pixels of different colors includes a corresponding pixel opening area, and pixel opening areas for the sub-pixels of different colors have the same or different sizes.

Illustratively, the sub-pixel includes a sub-pixel driving circuit and a light emitting element, the sub-pixel driving circuit is coupled to an anode of the light emitting element. Illustratively, the sub-pixel driving circuit includes a circuit structure of 7T1C (i.e., 7 transistors and one capacitor), but the present disclosure is not limited thereto.

Illustratively, the signal line 40 includes one or more of the following: a data line Data, a positive power signal line VDD, a negative power signal line VSS, an initialization signal line Vinit, a reference signal line, a first reset signal line Res1, a second reset signal line Res2, a gate line Gate, and a light-emitting control signal line EM. Each of a positive power supply signal transmitted by the positive power signal line VDD, a negative power supply signal transmitted by the negative power signal line VSS, a reference signal transmitted by the reference signal line, and a initialization signal transmitted by the initialization signal line Vinit is a stable signal. Each of a data signal transmitted by the data line Data, a first reset signal transmitted by the first reset signal line Res1, a second reset signal transmitted by the second reset signal line Res2, a scanning signal transmitted by the gate line Gate, and a light-emitting control signal transmitted by the light-emitting control signal line EM is a variable signal.

Illustratively, various types of signal lines 40 as described above each is coupled to a corresponding sub-pixel driving circuit of a sub-pixel, for providing a corresponding signal to the corresponding sub-pixel driving circuit. The sub-pixel driving circuit generates a driving signal according to the received various signals, and controls the light emitting element to emit light according to the control signal.

Illustratively, the display substrate further includes the grid-shaped cathode layer 30. The light-emitting element further includes a light-emitting functional layer at a side of the anode facing away from the base substrate 70, and the cathode layer 30 is located at a side of the light-emitting functional layer facing away from the base substrate 70. Illustratively, the light-emitting functional layer includes an electron injection layer, an electron transport layer, an organic light-emitting material layer, a hole transport layer, and a hole injection layer which are arranged in a stack.

Illustratively, the cathode layer 30 includes the plurality of first cathode patterns 301 and the plurality of second cathode patterns 302, the plurality of first cathode patterns 301 and the plurality of second cathode patterns 302 are formed as a one-piece structure.

Illustratively, the plurality of first cathode patterns 301 and the second cathode patterns 302 each have a rectangular structure, and the first cathode pattern 301 and the second cathode pattern 302 have different sizes.

Illustratively, the plurality of first cathode patterns 301 is arranged in an array, the plurality of first cathode patterns 301 may be divided into a plurality of rows of first cathode patterns 301 and a plurality of columns of first cathode patterns 301, each row of first cathode patterns 301 includes multiple first cathode patterns 301 arranged in a second direction, each column of first cathode patterns 301 includes multiple second cathode patterns 302 arranged in a first direction, the first direction intersects with the second direction. Illustratively, adjacent first cathode patterns 301 arranged in the first direction are coupled via at least one second cathode pattern 302, and adjacent first cathode patterns 301 arranged in the second direction are coupled via at least one second cathode pattern 302.

Illustratively, the first direction includes a horizontal direction and the second direction includes a vertical direction.

Illustratively, an orthographic projection of the second cathode pattern 302 onto the base substrate 70 covers an orthographic projection of at least part of the signal lines 40 onto the base substrate 70.

Figure 7:
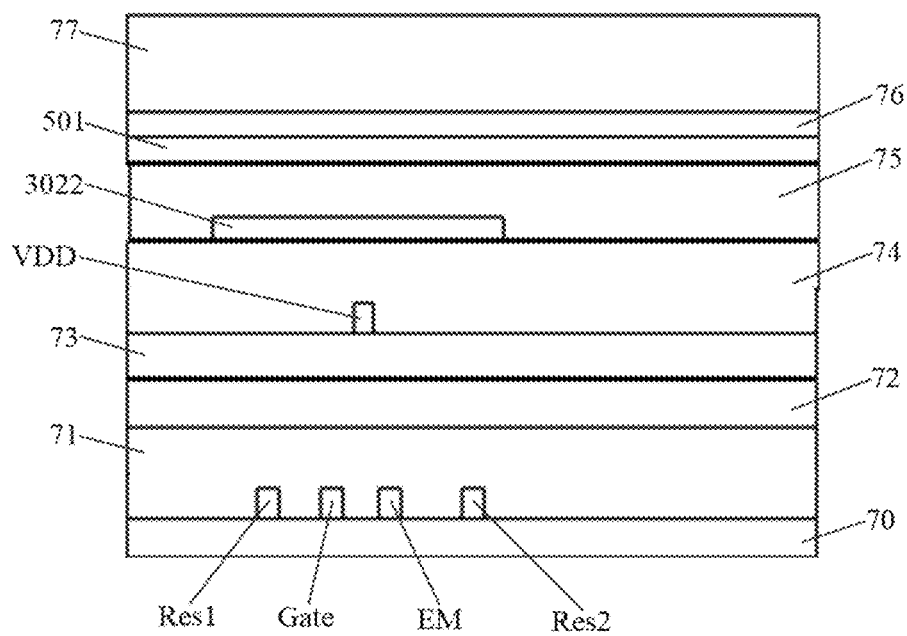
FIG. 7 is a schematic diagram of a cross-section taken along a direction D1D2 in FIG. 6.
Figure 8:
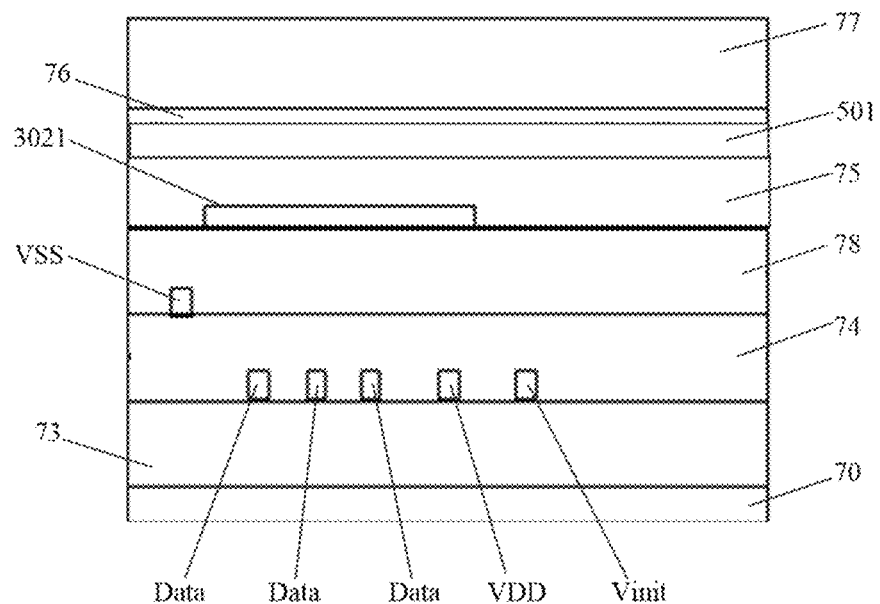
FIG. 8 is a schematic diagram of a cross-section taken along a direction E1E2 in FIG. 6.

It should be noted that FIGS. 7 and 8 illustrates a first insulating layer 71, a second gate metal layer 72, a second insulating layer 73, a third insulating layer 74, an encapsulation layer 75, a fourth insulating layer 76, a fifth insulating layer 78 and a cover plate 77. An optical adhesive and a polarizer is further provided between the cover plate 77 and the fourth insulating layer 76, or on a side of the cover plate 77 facing away from the base substrate.

According to the above-mentioned specific structure of the display substrate, it can be seen that in the display substrate provided by the embodiments of the present disclosure, the cathode layer 30 is arranged to include the first cathode patterns 301 and the second cathode patterns 302, so that the cathode is formed as a grid structure. In this way, when the display substrate is applied to a touch-control display device, an overlapping area between the cathode layer 30 and a touch-control layer 50 in the touch-control display device can be reduced, a parasitic capacitance between the touch-control layer 50 and the cathode layer 30 can be reduced, a load of the touch-control layer 50 can be reduced, and the signal attenuation of the touch-control layer 50 can be reduced. A reduced amount of sensing in the touch-control layer 50 in the related art can be improved, thereby effectively improving the touch performance.

Furthermore, in the display substrate provided by the embodiments of the present disclosure, by arranging the orthographic projection of the second cathode pattern 302 onto the base substrate 70 to be at least partially overlapped with the orthographic projection of at least part of the signal lines 40 onto the base substrate 70, the second cathode pattern 302 can function as a shielding against signals for displaying which are transmitted on the signal lines 40, thereby reducing the mutual interference between the touch-control signal and the signals for displaying. In this way, the touch-control signal-to-noise ratio of the touch-control layer 50 can be improved, a distortion of the touch-control signal distortion can be reduced, the touch-control performance can be improved, and a displaying performance of the touch-control display device can be improved.

In addition, in the display substrate provided by the embodiments of the present disclosure, there is no need for providing an additional shielding layer, ensuring good flexibility of the display substrate. Further, in the display substrate provided by the embodiments of the present disclosure, there is no need to perform a touch-control signal scanning during a non-displaying period by algorithm design so as to reduce display interference, the time for performing algorithm does not increase and the touch-control reporting rate does not decrease.

As shown in FIG. 2, FIG. 4, FIG. 5, FIG. 10, and FIGS. 12-16, in some embodiments, an orthographic projection of the first cathode pattern 301 onto the base substrate 70 is provided to be at least partially overlapped with an orthographic projection of at least part of the signal lines 40 onto the base substrate 70.

Illustratively, the orthographic projection of the first cathode pattern 301 onto the base substrate 70 at least partially overlaps with an orthographic projection of a portion of the signal line 40, which is adjacent to the pixel opening area, onto the base substrate 70.

With the above-mentioned arrangement, the first cathode pattern 301 play the role of a shielding against signals for displaying transmitted on the signal lines 40. In this way, when the display substrate is applied to a touch-control display device, the mutual interference between the touch-control signal and the signals for displaying can be reduced. As a result, the touch-control signal-to-noise ratio of the touch-control layer 50 can be effectively improved, a distortion of the touch-control signal can be avoided, and both the touch-control performance and the displaying performance of the touch-control display device can be improved.

Figure 2:
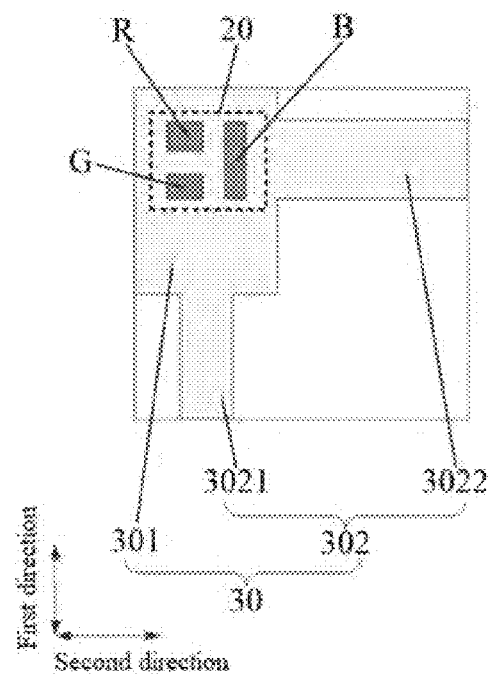
FIG. 2 is an enlarged view of a portion A of FIG. 1.
Figure 3:
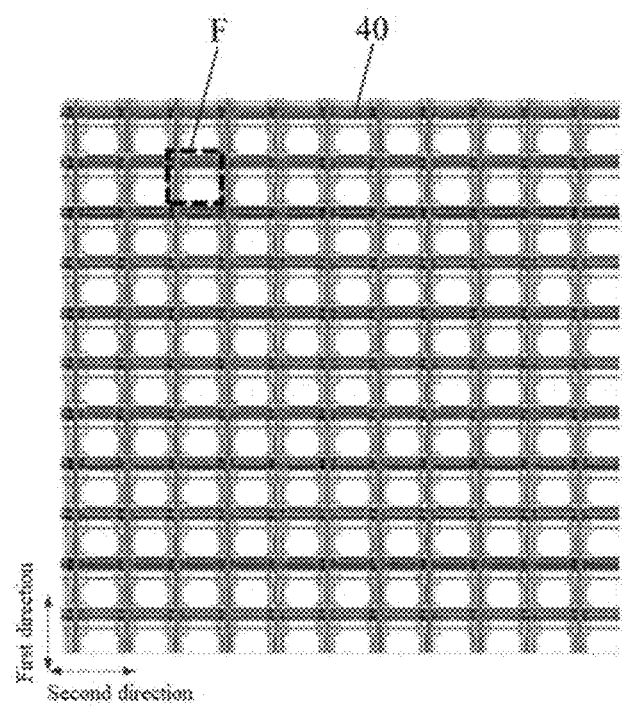
FIG. 3 is a schematic diagram of a layout of a cathode layer and signal lines provided in an embodiment of the present disclosure.
Figure 4:
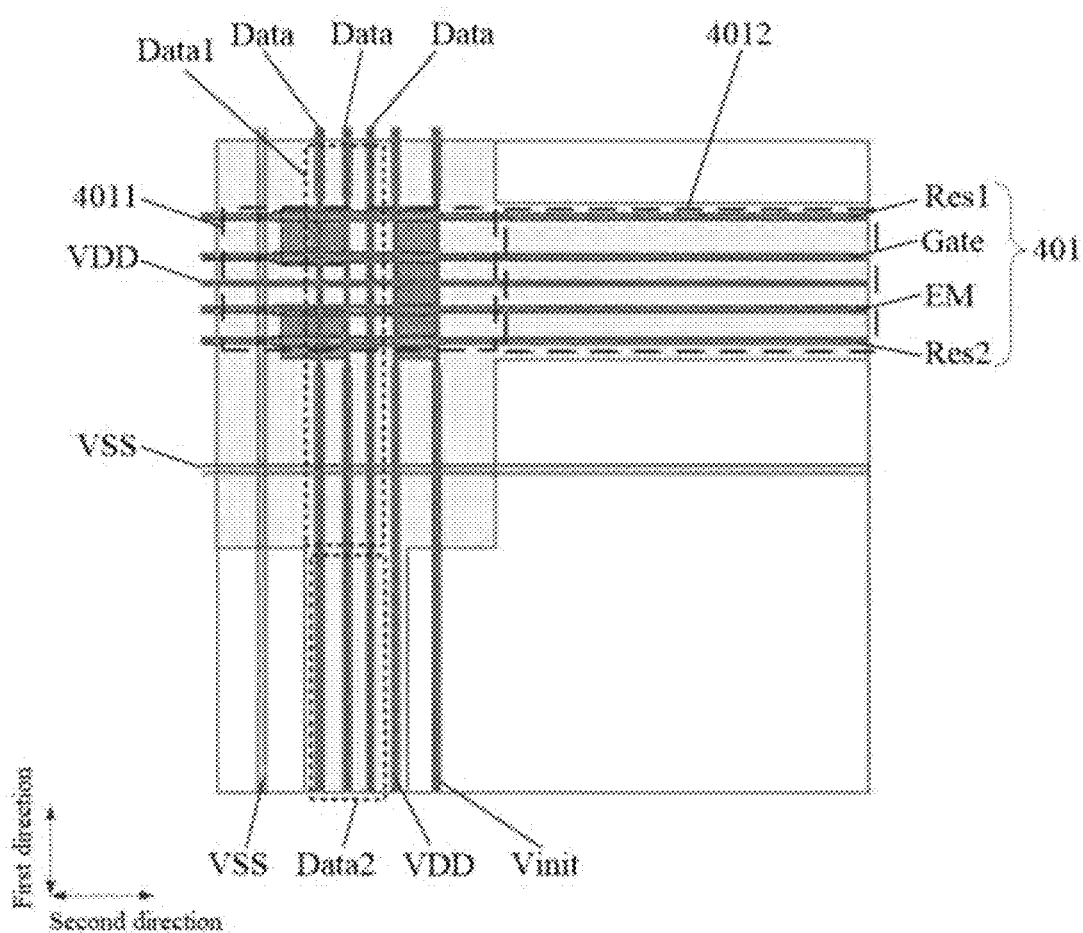
FIG. 4 is an enlarged view of a portion F of FIG. 3.
Figure 5:
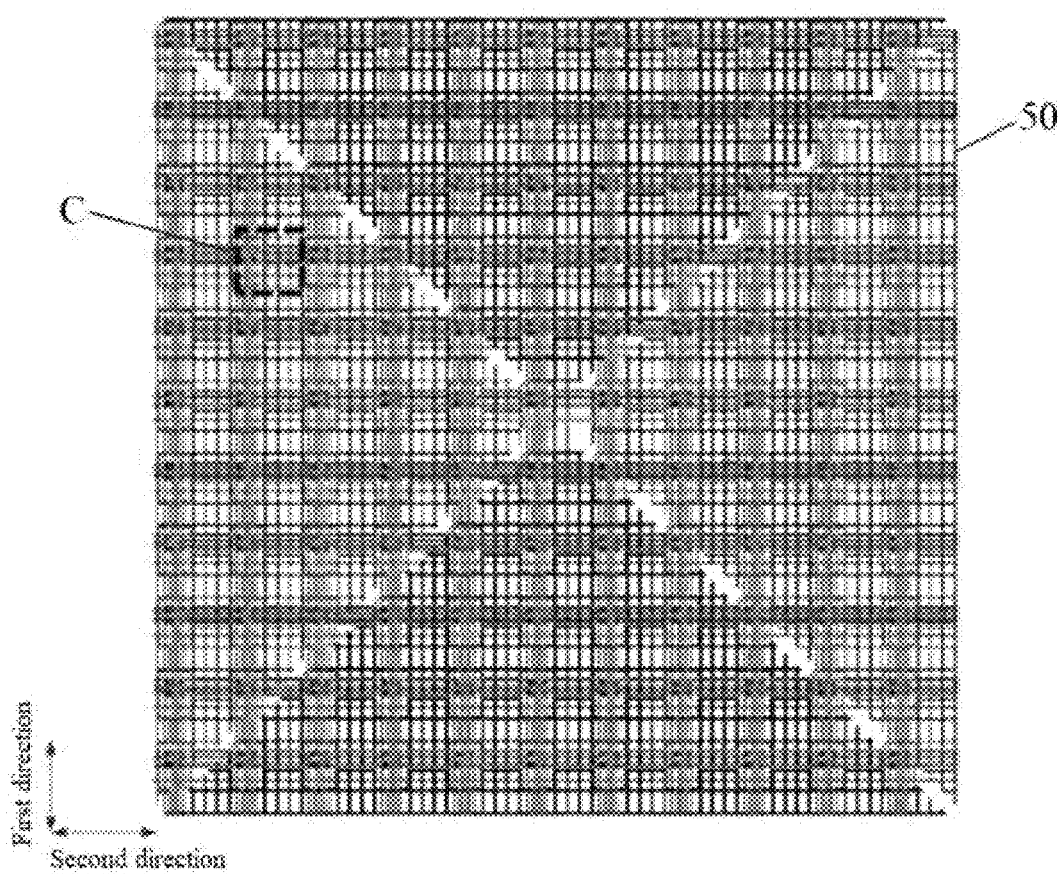
FIG. 5 is a schematic diagram of a first layout of a cathode layer, signal lines and a touch-control layer provided in an embodiment of the present disclosure.

As shown in FIGS. 2 to 4, in some embodiments, the plurality of second cathode patterns 302 includes a plurality of first sub-patterns 3021, and adjacent first cathode patterns 301 disposed in the first direction are coupled via at least one first sub-pattern 3021.

The signal lines 40 includes a plurality of data lines Data, the data lines Data includes a first data portion Data1 and a second data portion Data2 alternately arranged in a first direction, an orthographic projection of the first data portion Data1 onto the base substrate 70 at least partially overlaps with an orthographic projection of a corresponding first cathode pattern 301 onto the base substrate 70, an orthographic projection of the second data portion Data2 onto the base substrate 70 at least partially overlaps with an orthographic projection of a corresponding first sub-pattern 3021 onto the base substrate 70.

Illustratively, the plurality of second cathode patterns 302 includes a plurality of first sub-patterns 3021 distributed in an array, at least part of the first sub-patterns 3021 extends in the first direction, the first sub-pattern 3021 is coupled to a first cathode pattern 301 adjacent thereto in the first direction.

Illustratively, the adjacent first cathode patterns 301 arranged in the first direction are coupled by multiple first sub-patterns 3021 arranged in the second direction.

Illustratively, the signal line 40 includes a plurality of data lines Data, and the plurality of data lines Data is arranged in the second direction. The data lines Data includes a first data portion Data1 and a second data portion Data2 alternately arranged along the first direction, the first data portion Data1 and the second data portion Data2 extend in the first direction, and in the same data line Data, the first data portion Data1 and the second data portion Data2 are formed as a one-piece structure.

Illustratively, in the display substrate, the first data portion Data1 is in one-to-one correspondence with the first cathode pattern 301.

Illustratively, the orthographic projection of the first data portion Data1 onto the base substrate 70 is covered by the orthographic projection of the corresponding first cathode pattern 301 onto the base substrate 70, and the orthographic projection of the second data portion Data2 onto the base substrate 70 is covered by the orthographic projection of the corresponding first sub-pattern 3021 onto the base substrate 70.

In the display substrate provided in the above-mentioned embodiment, by arranging that the orthographic projection of the first data portion Data1 onto the base substrate 70 to be at least partially overlapped with the orthographic projection of the corresponding first cathode pattern 301 onto the base substrate 70, and the orthographic projection of the second data portion Data2 onto the base substrate 70 to be at least partially overlapped with the orthographic projection of the corresponding first sub-pattern 3021 onto the base substrate 70, the first cathode pattern 301 and the first sub-pattern 3021 function as a shielding against the data signal transmitted on the data line Data. In this way, when the display substrate is applied to a touch-control display device, the mutual interference between the touch-control signal and the data signal can be reduced. As a result, the touch-control signal-to-noise ratio of the touch-control layer can be effectively improved, a distortion of the touch-control signal can be avoided, and both the touch-control performance and the displaying performance of the touch-control display device can be improved.

As shown in FIGS. 3 and 4, in some embodiments, the plurality of pixel units 20 includes a plurality of columns of pixel units 20, each column of pixel units 20 including multiple pixel units 20 arranged along the first direction, each column of pixel units 20 includes at least one column of sub-pixels, each column of sub-pixels includes a plurality of sub-pixels arranged along the first direction; the columns of sub-pixels are in one-to-one correspondence to the data lines Data, and sub-pixels in the same share one corresponding data line Data.

First data portions Data1 are respectively coupled to corresponding sub-pixels, and second data portions Data2 are coupled to the first data portions Data1 adjacent thereto in the first direction.

Illustratively, the plurality of pixel units 20 may be divided into a plurality of rows of pixel units 20 arranged in the first direction and a plurality of columns of pixel units 20 arranged in the second direction, each row of pixel units 20 includes multiple pixel units 20 arranged along the second direction. Each column of pixel units 20 includes multiple pixel units 20 arranged along the first direction.

Illustratively, each column of pixel units 20 includes at least one column of sub-pixels, each column of sub-pixels includes a plurality of sub-pixels arranged along the first direction. All the columns of sub-pixels in the display substrate are in one-to-one correspondence to the plurality of data lines Data in the display substrate.

Illustratively, various sub-pixels in the same column of sub-pixels share a corresponding one of the data lines Data, and the corresponding one data line Data is coupled to sub-pixel driving circuits in the various sub-pixels corresponding thereto respectively.

Illustratively, each column of pixel units 20 includes three columns of sub-pixels.

By arranging various sub-pixels in the same column of sub-pixels to be coupled to the same one date line Data, the quantity of data lines Data used in the display substrate can be reduced, thereby simplifying the structure of the display substrate, and reducing the layout difficulty and manufacturing cost of the display substrate.

As shown in FIGS. 2 to 4, in some embodiments, adjacent first cathode patterns 301 arranged in the first direction are coupled through one first sub-pattern 3021.

Each column of pixel units 20 includes at least two columns of sub-pixels. In at least two data lines Data corresponding to the at least two columns of sub-pixels, each of second data portions Data2, which are located at the same row in the second direction, at least partially overlaps with the orthographic projection of the same one first sub-pattern 3021 onto the base substrate 70; and the second direction intersects with the first direction.

Illustratively, in the at least two data lines Data corresponding to the at least two columns of sub-pixels, the second data portions Data2 located at the same row in the second direction form a group of data lines, and the groups of data lines in the display substrate are in one-to-one correspondence to the first sub-patterns 3021 in the display substrate.

Illustratively, in the at least two data lines Data corresponding to the at least two columns of sub-pixels, each of the second data portions Data2 located at the same row in the second direction is covered by an orthographic projection of the same corresponding one first sub-pattern 3021 onto the base substrate 70.

Figure 10:
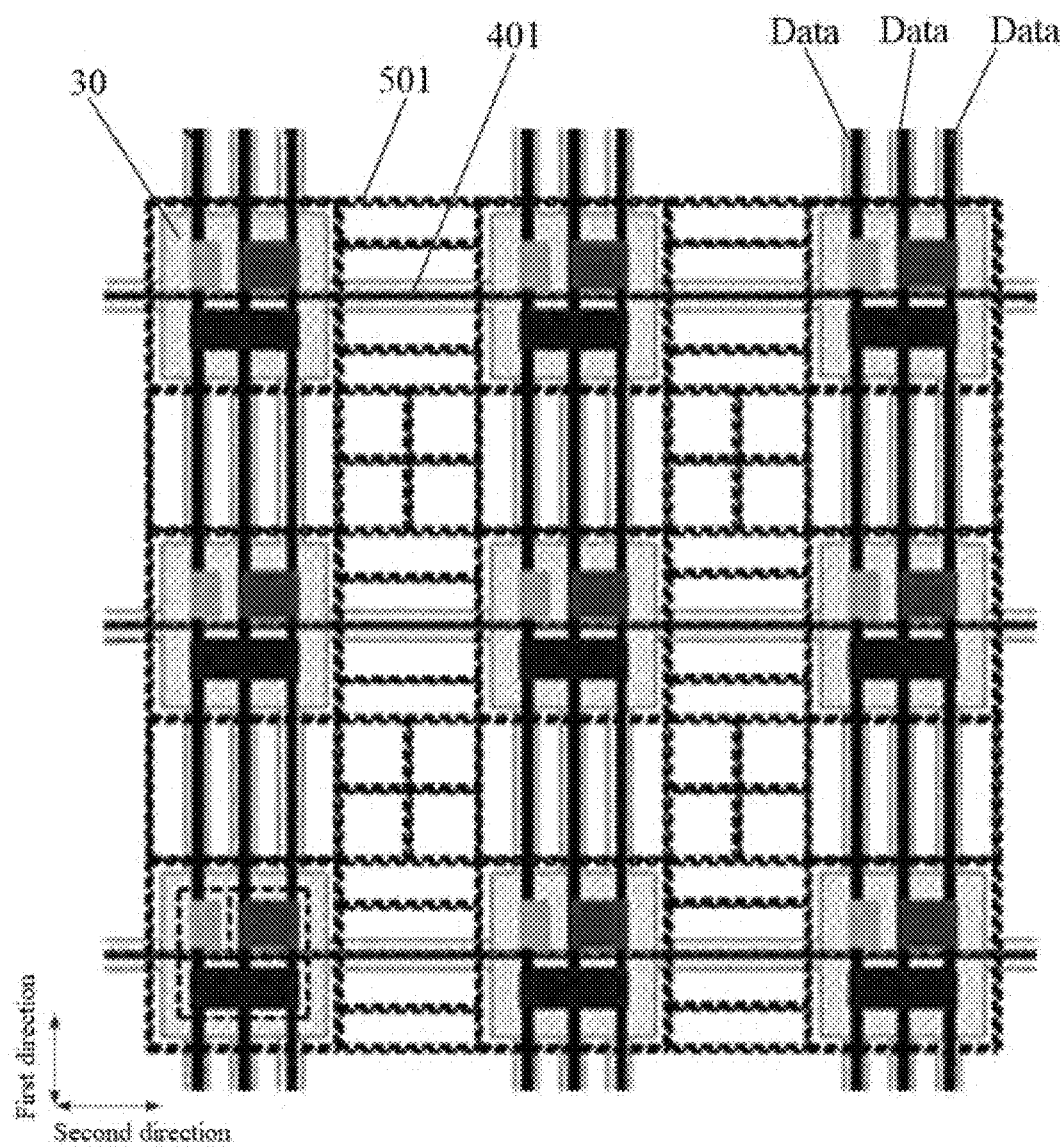
FIG. 10 is a schematic diagram of a second layout of a cathode layer, signal lines and a touch-control layer provided in an embodiment of the present disclosure.
Figure 11:
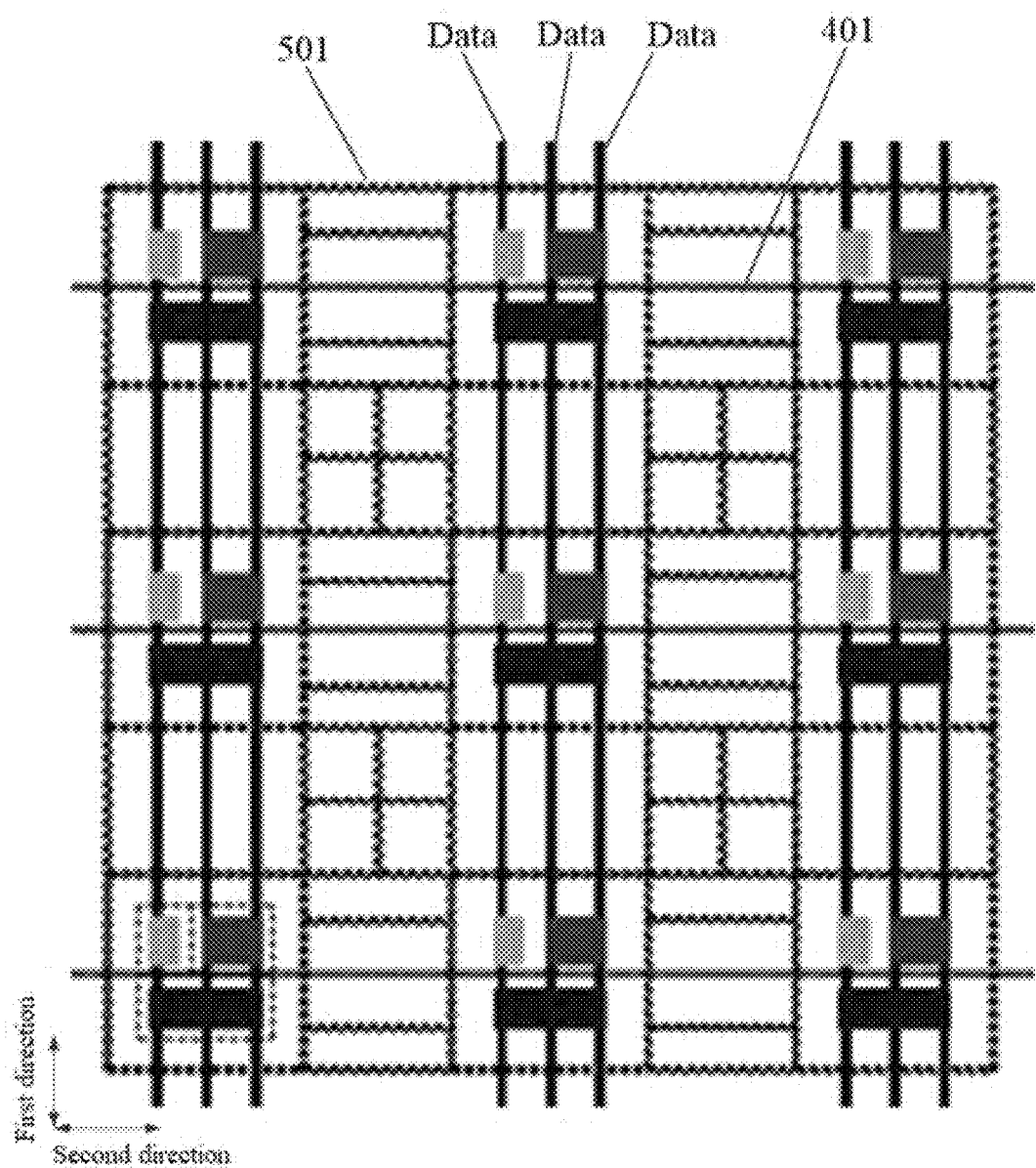
FIG. 11 is a schematic diagram of a layout of signal lines and a touch-control layer provided in an embodiment of the present disclosure.
Figure 12:
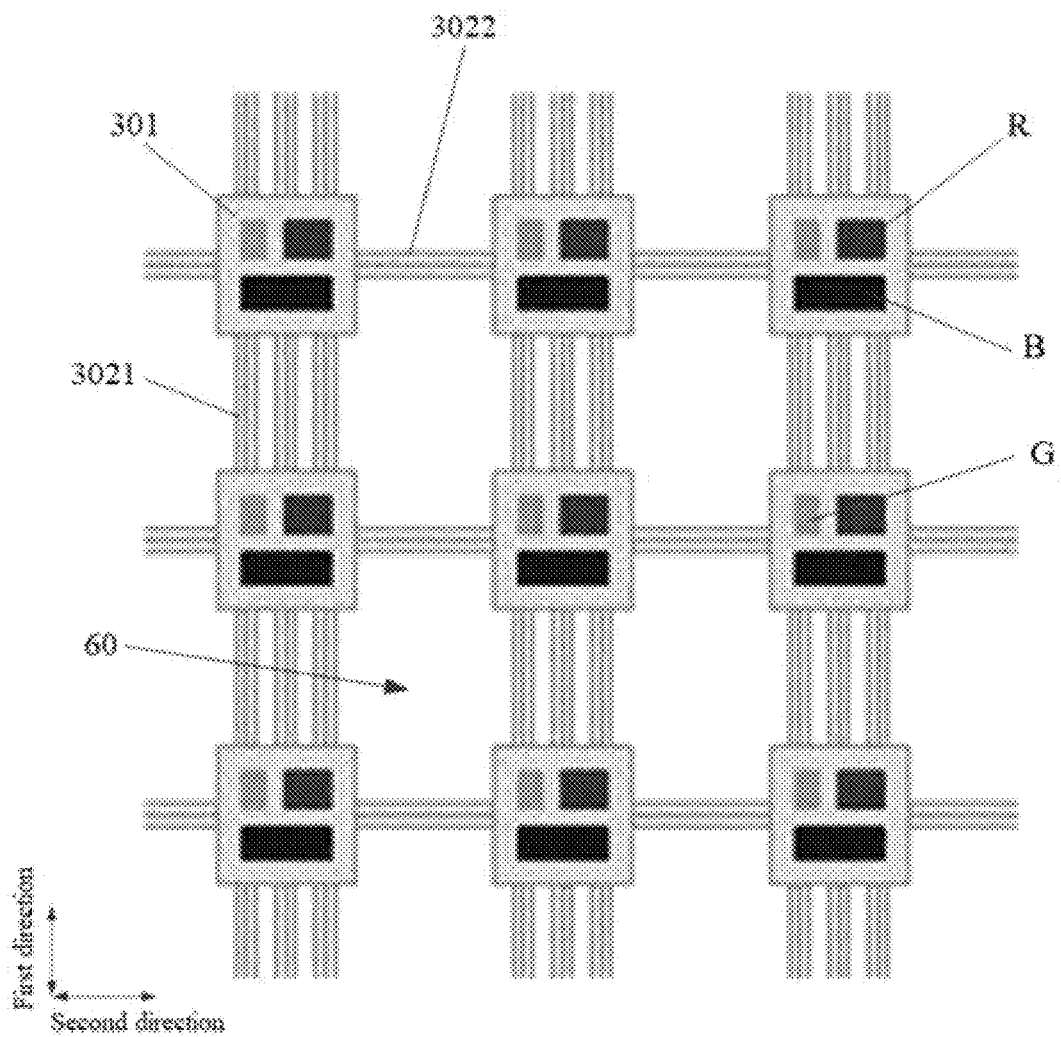
FIG. 12 is a schematic diagram of a second layout of a cathode layer and pixel units provided in an embodiment of the present disclosure.
Figure 13:
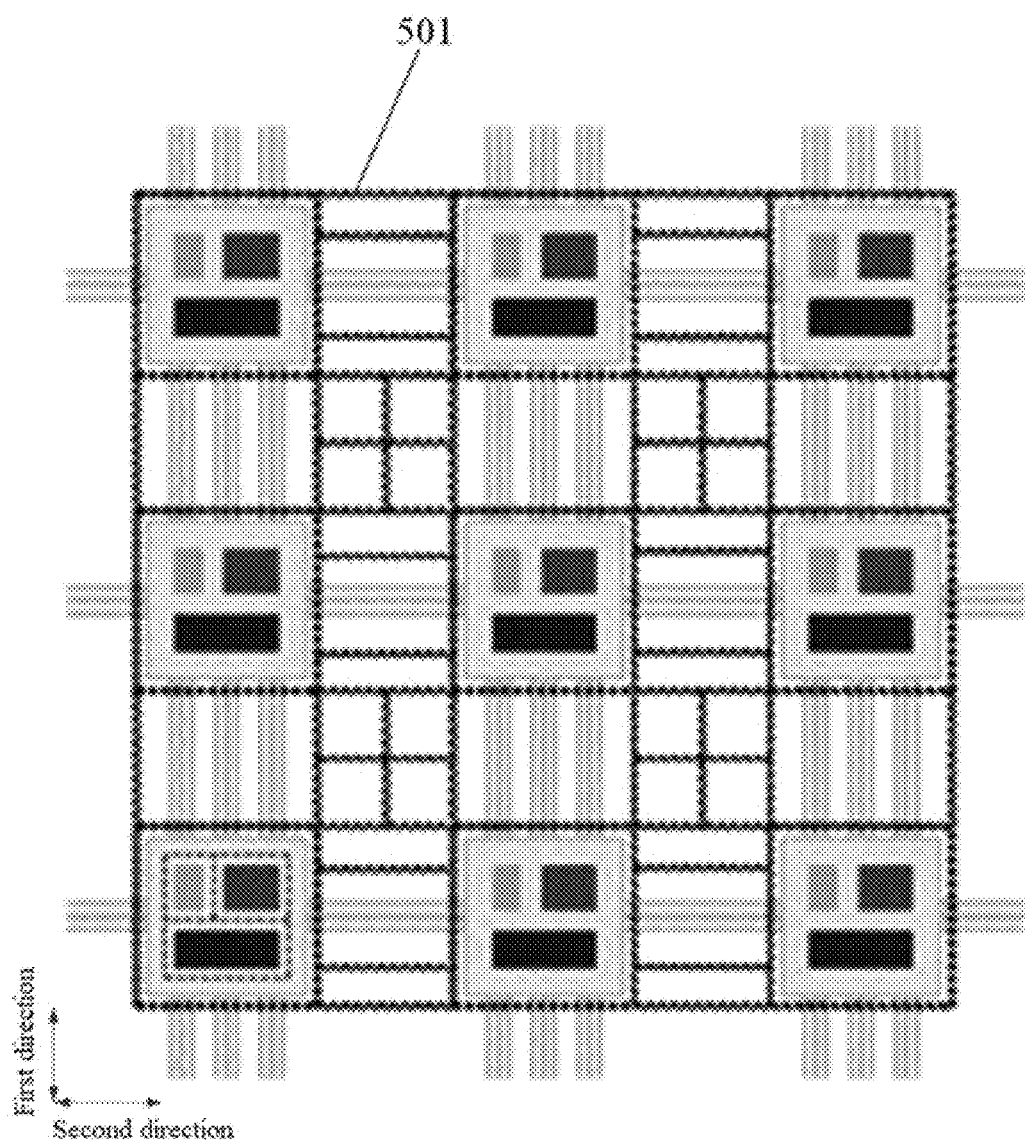
FIG. 13 provides a schematic diagram of a layout of a cathode layer and a touch-control layer provided in an embodiment of the present disclosure.
Figure 14:
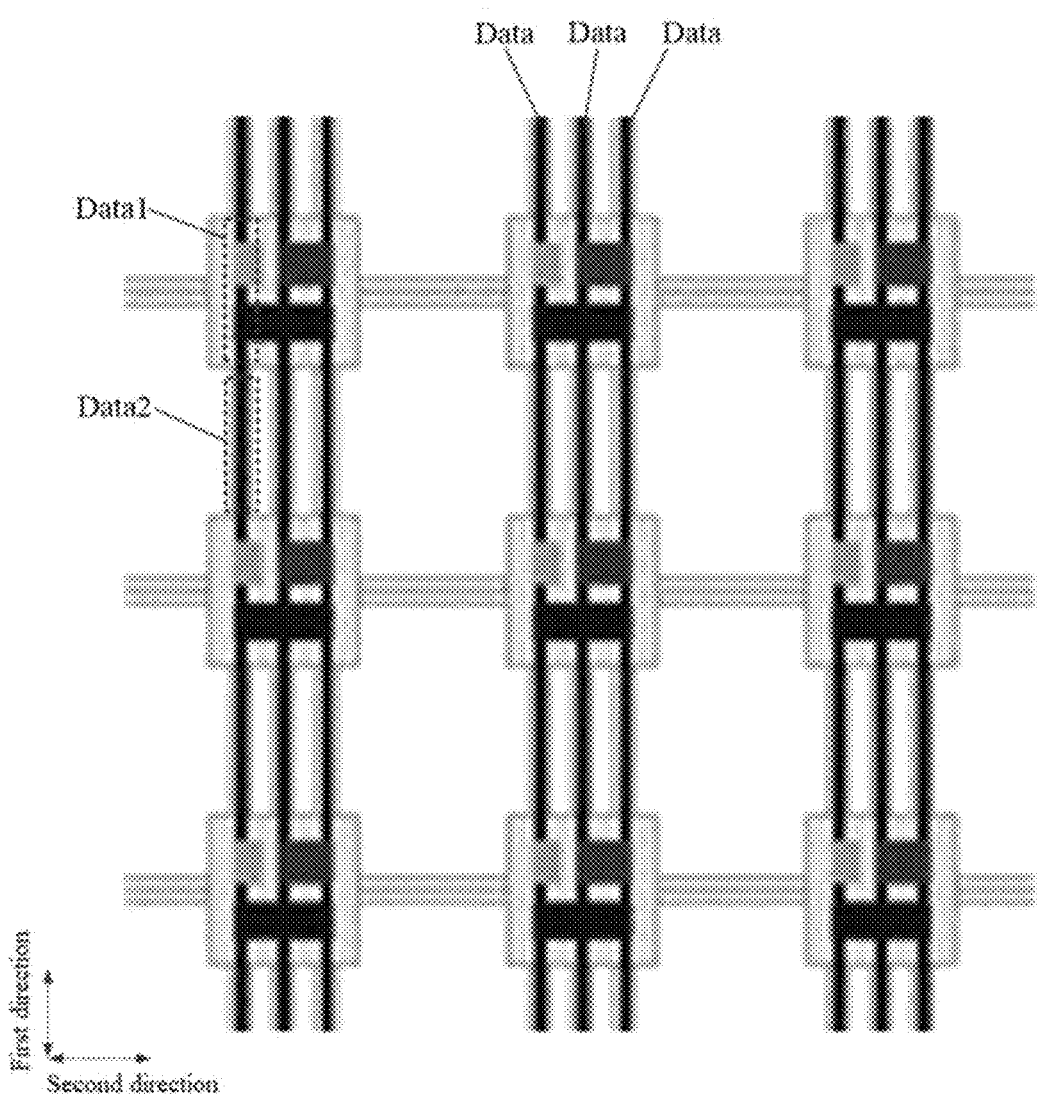
FIG. 14 is a schematic diagram of a layout of a cathode layer and data lines provided in an embodiment of the present disclosure.

As shown in FIGS. 10, 12 and 14, in some embodiments, adjacent first cathode patterns 301 arranged in the first direction are coupled via at least two first sub-patterns 3021, the at least two first sub-patterns 3021 od arranged along the second direction, the second direction intersects with the first direction.

Each column of pixel units 20 includes at least two columns of sub-pixels, in at least two data lines Data corresponding to the at least two columns of sub-pixels, various second data portions Data2 are in-one-to-one correspondence to the at least two first sub-pattern 3021, and an orthographic projection of the second data portion Data2 onto the base substrate 70 at least partially overlaps with an orthographic projection of a corresponding first sub-pattern onto the base substrate 70.

The above-mentioned arrangement manner is beneficial to further reduce the overall area of the cathode layer 30, which can reduce the overlapping area between the cathode layer 30 and the touch-control layer 50 (including the touch-control electrode 501) in the touch-control display device, reduce the parasitic capacitance between the touch-control layer 50 and the cathode layer 30, reduce the load of the touch-control layer 50, reduce the signal attenuation of the touch-control layer 50, such that the reduced sensing amount of the touch-control layer 50 in the related art can be increased, thereby effectively improving the touch-control performance.

As shown in FIGS. 2 to 5, 10 and 12, in some embodiments, the plurality of second cathode patterns 302 includes multiple second sub-patterns 3022, and adjacent first cathode patterns 301 arranged in the second direction are coupled via at least one second sub-pattern 3022.

The signal line 40 includes a plurality of scanning lines 401, the scanning line 401 include a first scanning portion 4011 and a second scanning portion 4012 which are alternately arranged along the second direction, an orthographic projection of the first scanning portion 4011 onto the base substrate 70 at least partially overlaps with an orthographic projection of a corresponding first cathode pattern 301 onto the base substrate 70, and an orthographic projection of the second scanning portion 4012 onto the base substrate 70 at least partially overlaps with an orthographic projection of a corresponding second sub-pattern 3022 onto the base substrate 70.

Illustratively, the plurality of second cathode patterns 302 includes the multiple second sub-patterns 3022 distributed in an array, at least part of the second sub-patterns 3022 extends in the second direction, the second sub-pattern 3022 is coupled to a first cathode pattern 301 adjacent thereto in the second direction.

Illustratively, adjacent first cathode patterns 301 arranged in the second direction are coupled with each other via a plurality of second sub-patterns 3022, the plurality of second sub-patterns 3022 is arranged along the first direction.

Illustratively, the signal lines 40 include a plurality of scanning lines 401 arranged along the first direction. The scanning line 401 includes a first scanning portion 4011 and a second scanning portion 4012 which are alternately arranged along the second direction, the first scanning portion 4011 and the second scanning portion 4012 extend along the second direction, and in the same scanning line 401, the first scanning portion 4011 and the second scanning portion 4012 are formed as a one-piece structure.

Illustratively, in the display substrate, first scanning portions 4011 are in one-to-one correspondence with first cathode patterns 301.

Illustratively, an orthographic projection of the first scanning portion 4011 onto the base substrate 70 is covered by an orthographic projection of a corresponding first cathode pattern 301 onto the base substrate 70, and an orthographic projection of the second scanning portion 4012 onto the base substrate 70 is covered by an orthographic projection of a corresponding second sub-pattern 3022 onto the base substrate 70.

In the display substrate provided in the above-mentioned embodiment, by arranging the orthographic projection of the first scanning portion 4011 onto the base substrate 70 to be at least partially overlapped with the orthographic projection of the corresponding the first cathode pattern 301 onto the base substrate 70, and arranging the orthographic projection of the second scanning portion 4012 onto the base substrate 70 to be at least partially overlapped with the orthographic projection of the corresponding the second sub-pattern 3022 onto the base substrate 70, the first cathode pattern 301 and the second sub-pattern 3022 can function as a shielding against the scanning signal transmitted on the scanning line 401. In this way, when the display substrate is applied to a touch-control display device, the mutual interference between the touch-control signal and the scanning signal cam be reduced. As such, the touch-control signal-to-noise ratio of the touch-control layer 50 can be effectively improved, a distortion of the touch-control signal can be avoided, and both the touch-control performance and the displaying performance of the touch-control display device can be improved.

As shown in FIG. 4, in some embodiments, the scanning line 401 includes one or more of: a gate line Gate, a reset signal line (such as a first reset signal line Res1 and a second reset signal line Res2), and a light-emitting control signal line EM.

Illustratively, the reset signal lines may include the first reset signal line Res 1 and the second reset signal line Res2 according to different requirements for driving circuits.

As shown in FIG. 4, in some embodiments, the plurality of pixel units 20 includes a plurality of rows of pixel units 20, each row of pixel units 20 includes multiple pixel units 20 arranged along the second direction, each row of pixel units 20 includes at least one row of sub-pixels, and each row of sub-pixels includes a plurality of sub-pixels arranged along the second direction; the rows of sub-pixel are in one-to-one correspondence to the scanning lines 401, and sub-pixels in the same row of sub-pixels share one corresponding scanning line 401.

First scanning portions 4011 are coupled to sub-pixels corresponding thereto, respectively, and the second scanning portion 4012 is coupled to an adjacent first scanning portion 4011 arranged in the second direction.

Illustratively, each row of pixel units 20 includes at least one row of sub-pixels, each row of sub-pixels includes a plurality of sub-pixels arranged in the second direction; all of rows of sub-pixels in the display substrate are in one-to-one correspondence to the plurality of scanning lines 401 in the display substrate.

Illustratively, various sub-pixels in the same row of sub-pixels shares a corresponding one scanning line 401, and the scanning line 401 is coupled to sub-pixel driving circuits in corresponding sub-pixels, respectively.

By arranging that the various sub-pixels in the same row of sub-pixels multiplexes the corresponding one scanning lines 401, the quantity of scanning lines 401 used in the display substrate can be reduced, thereby simplifying the structure of the display substrate, and reducing the layout difficulty and manufacturing cost of the display substrate.

Figure 15:
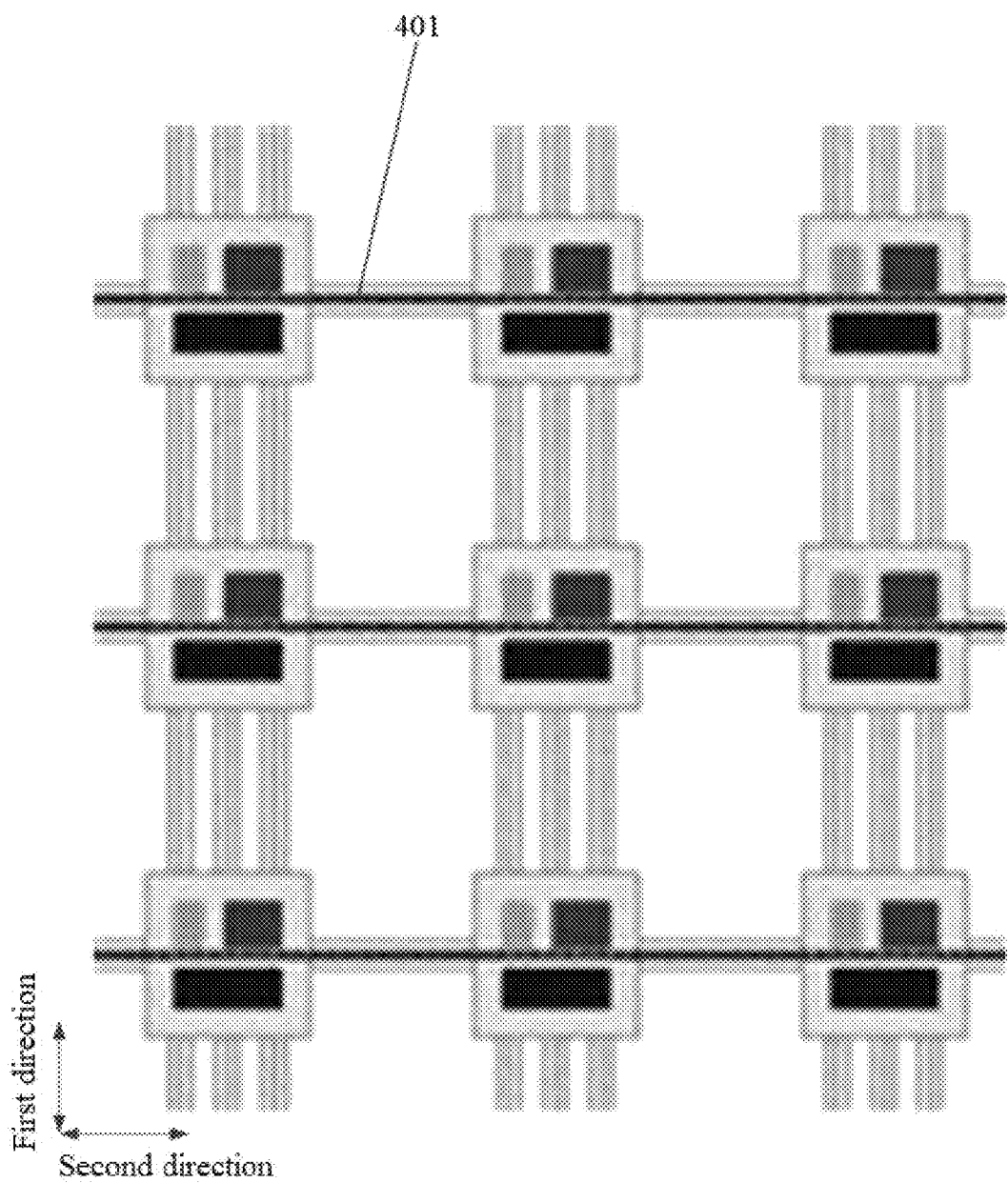
FIG. 15 is a schematic diagram of a layout of a cathode layer and scanning lines provided in an embodiment of the present disclosure.
Figure 16:
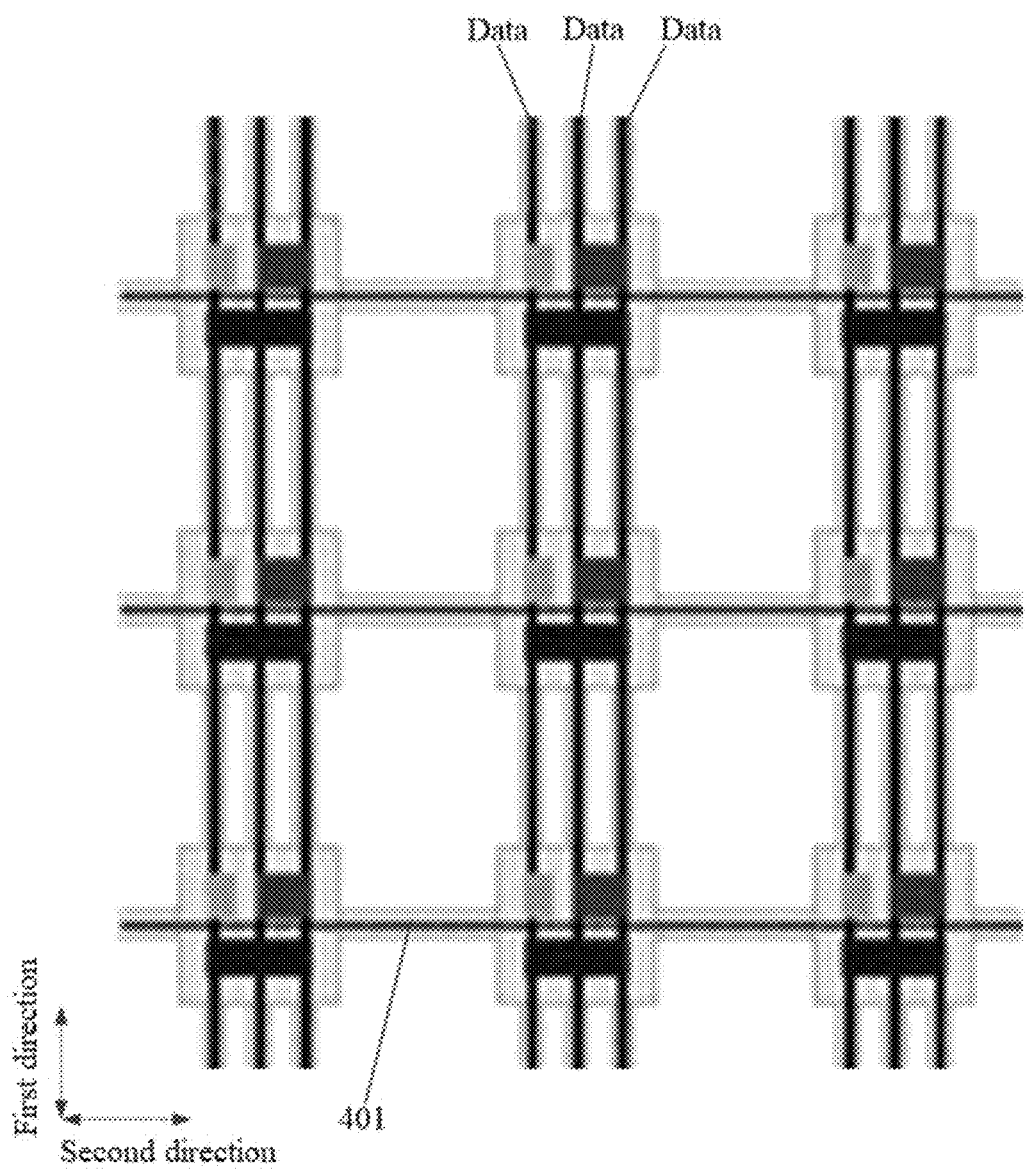
FIG. 16 is a schematic diagram of a layout of a cathode layer and signal lines provided in an embodiment of the present disclosure.

As shown in FIG. 4, and as shown in FIGS. 15 and 16, in some embodiments, adjacent first cathode patterns 301 arranged in the second direction are coupled through one second sub-pattern 3022.

Each row of pixel units 20 includes at least two rows of sub-pixels. In at least two scanning lines 401 corresponding to the at least two rows of sub-pixels, each of second scanning portions 4012, which are located at the same column in the first direction, at least partially overlaps with an orthographic projection of the same one second sub-pattern 3022 onto the base substrate 70, the second direction intersects with the first direction.

Illustratively, in the at least two scanning lines 401 corresponding to the at least two rows of sub-pixels, the second scanning portions 4012, which are located at the same column in the first direction, are grouped as a group of scanning lines, groups of scanning lines in the display substrate are in one-to-one correspondence to the first sub-pattern 3021 in the display substrate.

Illustratively, in the at least two scanning lines 401 corresponding to the at least two rows of sub-pixels, each of the second scanning portions 4012, which are located at the same column in the first direction, is covered by an orthographic projection of the same one corresponding first sub-pattern 3021 onto the base substrate 70.

In some embodiments, adjacent first cathode patterns 301 arranged in the second direction are coupled via at least two second sub-patterns 3022, the at least two second sub-patterns 3022 are arranged along the first direction. An orthographic projection of the second scanning portion 4012 onto the base substrate is covered by an orthographic projection of a corresponding one second sub-pattern 3022 onto the base substrate.

As shown in FIGS. 2 and 12, in some embodiments, in the second direction, a width of the first sub-pattern 3021 is set to be smaller than a width of the first cathode pattern 301; and/or in the first direction, a width of the second sub-pattern 3022 is smaller than the width of the first cathode pattern 301.

The above-mentioned arrangement manner can reduce the layout space occupied by the cathode layer 30 as a whole, which effectively reduce the overlapping area between the cathode layer 30 and the touch-control layer 50, reduce the parasitic capacitance between the touch-control layer 50 and the cathode layer 30, reduce the load of the touch-control layer 50, reduce the signal attenuation of the touch-control layer 50, such that the reduced sensing amount of the touch-control layer 50 in the related art can be increased, thereby improving the touch-control performance.

As shown in FIGS. 1 and 4, in some embodiments, the display substrate further includes a grid-shaped negative power signal line VSS, at least a part of the negative power signal line VSS is located between the cathode layer 30 and the base substrate 70, the negative power signal line VSS is coupled to the cathode layer 30.

Illustratively, the display substrate includes following elements sequentially stacked on the base substrate 70 in a direction away from the base substrate 70: an active layer, a first gate insulating layer, a first gate metal layer, a second gate insulating layer, a second gate metal layer, an interlayer insulating layer, a first source-drain metal layer, a first planar layer, a second source-drain metal layer, a second planar layer, an anode layer, a pixel defining layer, a light-emitting functional layer, a cathode layer 30 and an encapsulation layer.

Illustratively, the display substrate further includes the negative power signal line VSS, and the negative power signal line VSS is formed by using the second source-drain metal layer.

Illustratively, the negative power signal line VSS is arranged in a grid, the negative power signal line VSS includes a plurality of first power supply portions and a plurality of second power supply portions, the first power supply portions and the second power supply portions are arranged to be intersect with one another, and the first power supply portions and the second power supply portions are formed as a one-piece structure.

With above-mentioned arrangement, the negative power signal line VSS is coupled to the cathode layer 30, which can effectively reduce the resistance of the cathode layer 30 and improve the stability of the cathode layer 30 for transmitting a negative power signal.

As shown in FIG. 5 to FIG. 9, FIG. 10, FIG. 11 and FIG. 13, embodiments of the present disclosure further provide a touch-control display device, including the display substrate provided in the above-mentioned embodiments. The touch-control display device further includes:

a touch-control layer 50, where the touch-control layer 50 is located at a side of the cathode layer 30 of the display substrate facing away from the base substrate 70 of the display substrate, and the touch-control layer 50 includes touch-control electrodes 501 distributed in an array, and the touch-control electrodes 501 are in a grid shape.

Illustratively, a buffer layer is disposed at a side of the encapsulation layer of the display substrate facing away from the base substrate 70 of the display substrate, and the touch-control layer 50 is located at a side of the buffer layer facing away from the base substrate 70.

Illustratively, the touch-control layer 50 includes the touch-control electrodes 501 arranged in an array, where the touch-control electrodes 501 include a first touch-control electrode and a second touch-control electrode, one of the first touch-control electrode and the second touch-control electrode serves as a driving electrode, and the other one of the first touch-control electrode and the second touch-control electrode serves as a sensing electrode.

Figure 9:
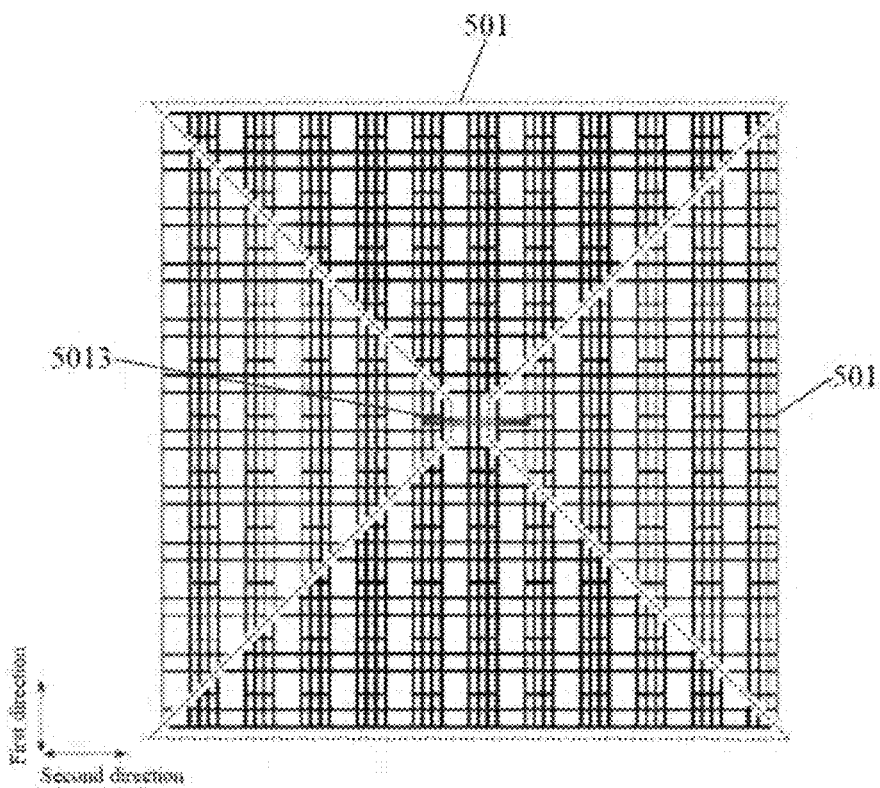
FIG. 9 is a schematic diagram of a layout of touch-control electrodes provided in an embodiment of the present disclosure.

As shown in FIG. 9, illustratively, the first touch-control electrode includes a plurality of first electrode blocks sequentially arranged along the first direction, the plurality of first electrode blocks is formed as a one-piece structure. The second touch-control electrode includes a plurality of second electrode blocks sequentially arranged along the second direction, and adjacent second electrode blocks are coupled via a connecting bridge 5013 arranged on a different layer. Illustratively, the first electrode blocks and the second electrode blocks are disposed in the same layer and made of the same material.

It should be noted that the touch-control electrode 501 is not limited to the above-described exemplary structure, as long as a normal touch-control function can be achieved.

In the touch-control display device provided in the embodiments of the present disclosure, by arranging the touch-control electrode 501 to be in a grid shape, the overlapping area between the touch-control layer 50 and the cathode layer 30 can be reduced, the parasitic capacitance between the touch-control layer 50 and the cathode layer 30 can be reduced, the load of the touch-control layer 50 can be reduced, the signal attenuation of the touch-control layer 50 can be reduced, a reduced sensing amount of the touch-control layer 50 in the related art can be improved, and the touch performance can be effectively improved.

As shown in FIG. 5, FIG. 6, and FIGS. 10 to 13, in some embodiments, an orthographic projection of the touch-control electrode 501 onto the base substrate 70 is arranged to be not overlapped with the orthographic projection of the first cathode pattern 301 in the cathode layer 30 onto the base substrate 70.

The above-mentioned arrangement further reduces the overlapping area between the touch-control layer 50 and the cathode layer 30, which can reduce the parasitic capacitance between the touch-control layer 50 and the cathode layer 30, reduce the load of the touch-control layer 50, reduce the signal attenuation of the touch-control layer 50, such that the reduced sensing amount of the touch-control layer 50 can be increase, thereby effectively improving the touch-control performance.

Figure 6:
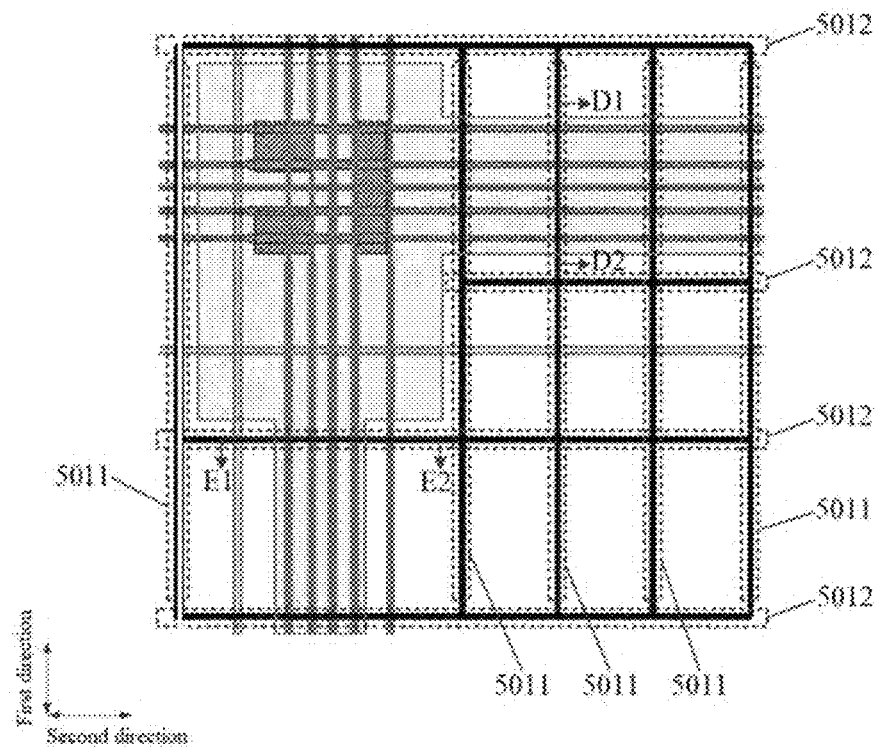
FIG. 6 is an enlarged view of a portion C of FIG. 5.

As shown in FIG. 6, in some embodiments, the touch-control electrode 501 includes a plurality of first touch-control portions 5011 and a plurality of second touch-control portions 5012, at least a part of the first touch-control portion 5011 extends in a first direction and at least a part of the second touch-control portion 5012 extends in a second direction, the first direction intersects with the second direction.

Illustratively, first touch-control portions 5011 and second touch-control portions 5012 belonging to the same one first touch-control electrode are arranged to be intersected with one another to form a grid structure. First touch-control portions 5011 and second touch-control portions 5012 belonging to the same one second touch-control electrode are arranged to be intersected with one another to form a grid structure.

Illustratively, the first touch-control portions 5011 and the second touch-control portions 5012, which belong to the same one first touch-control electrode, are formed as a one-piece structure. The first touch-control portions 5011 and the second touch-control portions 5012, which belongs to the same one second touch-control electrode, are formed as a one-piece structure.

Illustratively, the plurality of first touch-control portions 5011 have the same length; or the lengths of the plurality of first touch-control portions 5011 are completely different; alternatively, a part of the first touch-control portions 5011 in the plurality of first touch-control portions 5011 has the same length, and another part of the first touch-control portions 5011 in the plurality of first touch-control portions 5011 has a different length.

Illustratively, the plurality of second touch-control portions 5012 have the same length; or the plurality of second touch-control portions 5012 have different lengths. Alternatively, some second touch-control portions 5012 in the plurality of second touch-control portions 5012 have the same length, and the rest second touch-control portions 5012 in the plurality of second touch-control portions 5012 have different lengths.

Illustratively, a width of the first touch-control portion 5011, in a direction perpendicular to the extending direction the first touch-control portion 5011, is equal to a width of the second touch-control portion 5012, in a direction perpendicular to the extending direction the second touch-control portion 5012.

Figure 17:
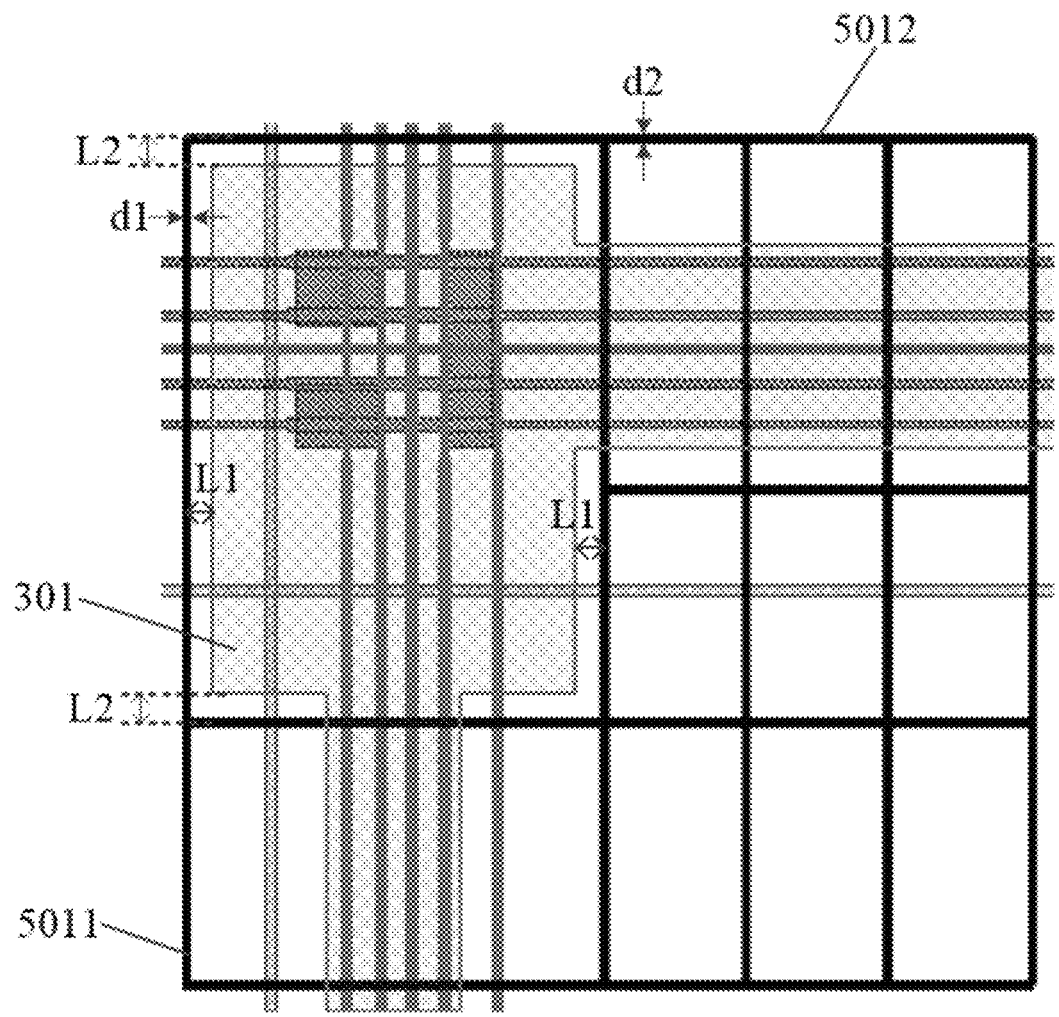
FIG. 17 is a schematic diagram showing a distance between a first cathode pattern and a touch-control portion provided in an embodiment of the present disclosure.

As shown in FIG. 4, FIG. 6, and FIG. 17, in some embodiments, the minimum distance L1 between the orthographic projection of the first cathode pattern 301 onto the base substrate 70 and the orthographic projection of the first touch-control portion 5011 adjacent thereto onto the base substrate 70 satisfies: $L1 \geq 0.5 \times d1$, where d1 is the width of the first touch-control portion 5011; and/or, the minimum distance L2 between the orthographic projection of the first cathode pattern 301 onto the base substrate 70 and the orthographic projection of the second touch-control portion 5012 adjacent thereto onto the base substrate 70 satisfies: L2≥0.5×d2, where d2 is the width of the second touch-control portion 5012.

Illustratively, d1 and d2 each ranges from 0.5 μm to 20 μm, inclusive.

Illustratively, the width of the first touch-control portion 5011 is a width of the first touch-control portion 5011 in a direction parallel to the base substrate 70 and in a direction perpendicular to the extending direction of the first touch-control portion 5011. The width of the second touch-control portion 5012 is a width of the second touch-control portion 5012 in the direction parallel to the base substrate 70 in a direction perpendicular to the extending direction of the second touch-control portion 5012.

With the arrangement that L1 satisfies L1≥0.5×d1, and/or L2 satisfies L2≥0.5×d2, the influence of the first cathode pattern 301 on the touch-control electrode 501 can be further reduced, which can reduce the parasitic capacitance between the touch-control layer 50 and the cathode layer 30, reduce the load of the touch-control layer 50, reduce the signal attenuation of the touch-control layer 50, such that the reduced sensing amount of the touch-control layer 50 in the related art can be increased, thereby effectively improving the touch-control performance.

As shown in FIG. 6, in some embodiments, the orthographic projection of the first touch-control portion 5011 onto the base substrate 70 is arranged to be not overlapped with the orthographic projection of the data line Data in the display substrate onto the base substrate 70.

Illustratively, the extending direction of the first touch-control portion 5011 and an extending direction of the data line Data are substantially parallel to one another.

With the above-mentioned arrangement, the generation of parasitic capacitance between the first touch-control portion 5011 and the data line Data can be avoided, which can reduce the mutual interference between the touch-control signal and the data signal, the touch-control signal-to-noise ratio of the touch-control layer 50 can be improved, the distortion of the touch-control signal can be improved, the touch-control performance and the displaying performance of the touch-control display device can both be improved.

As shown in FIG. 6, in some embodiments, the orthographic projection of the second touch-control portion 5012 onto the base substrate 70 is arranged to be not overlapped with the orthographic projection of the scanning line 401 in the display substrate onto the base substrate 70.

Illustratively, the extending direction of the second touch-control portion 5012 and an extending direction of the scanning line 401 are substantially parallel to one another.

The above-mentioned arrangement can avoid the generation of parasitic capacitance between the second touch-control portion 5012 and the scanning line 401, reduce the mutual interference between the touch-control signal and the scanning signal. In this way, the touch-control signal-to-noise ratio of the touch-control layer 50 can be improved, the distortion of the touch-control signal can be avoided, the touch-control performance, and the displaying performance of the touch-control display device can both be improved.

As shown in FIGS. 6 and 10 to 13, in some embodiments, the touch-control display device includes a first area and a second area 60.

The orthographic projection of the cathode layer 30 onto the base substrate 70 is located within the orthographic projection of the first area onto the base substrate 70.

The layout density for first touch-control portions 5011 and second touch-control portions 5012 in the first area is less than the layout density for first touch-control portions 5011 and second touch-control portions 5012 in the second area 60.

Illustratively, the orthographic projection of the cathode layer 30 onto the base substrate 70 coincides with (i.e., overlap and have the same size) the orthographic projection of the first area onto the base substrate 70.

Illustratively, the quantity of the first touch-control portions 5011 in the first area is smaller than the quantity of the first touch-control portions 5011 in the second area 60.

Illustratively, the quantity of the second touch-control portions 5012 in the first area is smaller than the quantity of the second touch-control portion 5012 in the second area 60.

By arranging the layout density of the first touch-control portions 5011 and the second touch-control portions 5012 in the first area to be less than the layout density of the first touch-control portions 5011 and the second touch-control portions 5012 in the second area 60, the resistance of the touch-control electrode 501 can be reduced without increasing the overlapping area between the touch-control electrode 501 and the cathode.

In some embodiments, the touch-control display device includes a transparent touch-control display device.

Illustratively, the touch-control display device includes a touch-control display device including active matrix organic light emitting diodes.

The pixel density of the transparent touch-control display device is relatively low, and the distance between adjacent pixel units 20 is relatively large.

The transparent touch-control display device has normal displaying, transparent displaying and touch-control functions.

It is to be noted that the touch-control display device may be: any product or component with a display function, such as a television, a display, a digital photo frame, a mobile phone, a tablet computer, and among others, the display device further includes a flexible circuit board, a printed circuit board and a back panel.

It is to be noted that the "same layer" in the embodiments of the present disclosure may refer to a film layer on the same structural layer. Or, for example, the film layer in the same layer may be a layer structure formed by forming a film layer for forming a specific pattern using the same film forming process and then patterning the film layer by one patterning process using the same mask plate. Depending on the particular pattern, a single patterning process may include multiple exposure, development, or etching processes, and the particular pattern in the resulting layer structure may or may not be continuous. The particular patterns may also be at different heights or have different thicknesses.

In the various method embodiments of the present disclosure, the serial number of each step cannot be used to define the order of each step, and for a person of ordinary skill in the art, without involving any inventive effort, changes in the order of each step are also within the scope of the present disclosure.

It should be noted that the various embodiments described herein are described in a progressive manner, the same or similar parts throughout the various embodiments can be referred to with each other, with each embodiment mainly focusing on differences from the other embodiments. In particular, the method embodiments are described more simply because they are substantially similar to the product embodiments, with reference to the partial description of the product embodiments.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. The terms "include" or "comprise", and the like, means that the presence of an element or item preceding the word covers the presence of the element or item listed after the word and equivalents thereof, but does not exclude other elements or items. The terms "connect", "coupling" or "coupled" and the like are not limited to physical or mechanical connections, but may include electrical connections, whether direct or indirect. The terms "upper", "lower", "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the embodiments above, particular features, structures, materials, or characteristics may be combined in any suitable manner in any one or more embodiments or examples.

While the present disclosure has been described with reference to the specific embodiments, the scope of the present disclosure is not limited thereto. Changes or substitutions, which can be readily conceived by those skilled in the art after reading the technical solution of the present disclosure, fall within the protection scope of the present disclosure. Therefore, the protection scope of the present disclosure is set forth in the claims.

What is claimed is:

1. A display substrate, comprising: a base substrate and a plurality of pixel units arranged in an array on the base substrate; wherein the pixel unit comprises at least one sub-pixel, and the sub-pixel comprises a pixel opening area; the display substrate further comprises:
    a plurality of signal lines, the signal line being arranged on the base substrate, the signal line being configured to provide a signal for a corresponding sub-pixel; and
    a grid-shaped cathode layer, wherein the cathode layer comprises a plurality of first cathode patterns and a plurality of second cathode patterns, the plurality of first cathode patterns is arranged in an array, and adjacent first cathode patterns are coupled via at least one second cathode pattern; an orthographic projection of the first cathode pattern onto the base substrate covers each pixel opening area in a corresponding pixel unit; an orthographic projection of the second cathode pattern onto the base substrate at least partially overlaps with an orthographic projection of at least part of the plurality of signal lines onto the base substrate;
    wherein the orthographic projection of the first cathode pattern onto the base substrate at least partially overlaps with the orthographic projection of the at least part of the plurality of signal lines onto the base substrate;
    wherein the plurality of second cathode patterns comprise a plurality of first sub-patterns, and adjacent first cathode patterns arranged in a first direction are coupled via at least one first sub-pattern; and
    the plurality of signal lines comprises a plurality of data lines, the data line comprises a first data portion and a second data portion alternately arranged in the first direction, an orthographic projection of the first data portion onto the base substrate at least partially overlaps with an orthographic projection of a corresponding first cathode pattern onto the base substrate, and an orthographic projection of the second data portion onto the base substrate at least partially overlaps with an orthographic projection of a corresponding first sub-pattern onto the base substrate.

2. The display substrate according to claim 1, wherein the plurality of pixel units comprise a plurality of columns of pixel units, each column of pixel units comprises multiple pixel units arranged along the first direction, each column of pixel units comprise at least one column of sub-pixels, and each column of sub-pixels comprise a plurality of sub-pixels arranged along the first direction; the at least one column of sub-pixels correspond to the plurality of data lines on a one-to-one basis, and sub-pixels in a same column of sub-pixels multiplex a corresponding data line; and
    the first data portion is coupled to a corresponding sub-pixel, and the second data portion is coupled to an adjacent first data portion in the first direction.

3. The display substrate according to claim 2, wherein the adjacent first cathode patterns arranged in the first direction are coupled via one first sub-pattern; and
    each column of pixel units comprises at least two columns of sub-pixels; in at least two data lines corresponding to the at least two columns of sub-pixels, second data portions, which are located at a same row in a second direction, at least partially overlap with an orthographic projection of the same one first sub-pattern onto the base substrate, the second direction intersects with the first direction.

4. The display substrate according to claim 2, wherein the adjacent first cathode patterns arranged in the first direction are coupled via at least two first sub-patterns, the at least two first sub-patterns are arranged in a second direction, the second direction intersects with the first direction; and
    each column of pixel units comprises at least two columns of sub-pixels; in at least two data lines corresponding to the at least two columns of sub-pixels, second data portions correspond to first sub-patterns on a one-to-one basis, and the orthographic projection of the second data portion onto the base substrate at least partially overlaps with an orthographic projection of a corresponding first sub-pattern onto the base substrate.

5. The display substrate according to claim 1, wherein the plurality of second cathode patterns comprises a plurality of second sub-patterns, and adjacent first cathode patterns arranged in a second direction are coupled via at least one second sub-pattern; and
    the plurality of signal lines comprises a plurality of scanning lines, the scanning line comprises a first scanning portion and a second scanning portion which are alternately arranged along the second direction, an orthographic projection of the first scanning portion onto the base substrate at least partially overlaps with an orthographic projection of a corresponding first cathode pattern onto the base substrate, and an orthographic projection of the second scanning portion onto the base substrate at least partially overlaps with an orthographic projection of a corresponding second sub-pattern onto the base substrate.

6. The display substrate according to claim 5, wherein the scanning line comprises one or more of: a gate line, a reset signal line and a light-emitting control signal line.

7. The display substrate according to claim 5, wherein the plurality of pixel units comprise a plurality of rows of pixel units, each row of pixel units comprises a plurality of pixel units arranged along the second direction, each row of pixel units comprise at least one row of sub-pixels, and each row of sub-pixels comprise a plurality of sub-pixels arranged along the second direction; the at least one row of sub-pixels correspond to the plurality of scanning lines on a one-to-one basis, and sub-pixels in a same row of sub-pixels multiplex a corresponding scanning line; and
the first scanning portion is coupled to a corresponding sub-pixel, and the second scanning portion is coupled to an adjacent first scanning portion in the second direction.

8. The display substrate according to claim 7, wherein the adjacent first cathode patterns arranged in the second direction are coupled via one second sub-pattern; and
each row of pixel units comprises at least two rows of sub-pixels, in at least two scanning lines corresponding to the at least two rows of sub-pixels, second scanning portions, which are located at a same column in the first direction, at least partially overlaps with an orthographic projection of the same one second sub-pattern onto the base substrate, and the second direction intersects with the first direction.

9. The display substrate according to claim 5, wherein in the second direction, a width of the first sub-pattern is less than a width of the first cathode pattern; and/or in the first direction, a width of the second sub-pattern is smaller than the width of the first cathode pattern.

10. The display substrate according to claim 1, wherein the display substrate further comprises a grid-shaped negative power signal line, at least a part of the negative power signal line is located between the cathode layer and the base substrate, and the negative power signal line is coupled to the cathode layer.

11. A touch-control display device, comprising a display substrate, wherein the display substrate comprises: a base substrate and a plurality of pixel units arranged in an array on the base substrate; wherein the pixel unit comprises at least one sub-pixel, and the sub-pixel comprises a pixel opening area; the display substrate further comprises:
a plurality of signal lines, the signal line being arranged on the base substrate, the signal line being configured to provide a signal for a corresponding sub-pixel; and
a grid-shaped cathode layer, wherein the cathode layer comprises a plurality of first cathode patterns and a plurality of second cathode patterns, the plurality of first cathode patterns is arranged in an array, and adjacent first cathode patterns are coupled via at least one second cathode pattern; an orthographic projection of the first cathode pattern onto the base substrate covers each pixel opening area in a corresponding pixel unit; an orthographic projection of the second cathode pattern onto the base substrate at least partially overlaps with an orthographic projection of at least part of the plurality of signal lines onto the base substrate;
wherein the orthographic projection of the first cathode pattern onto the base substrate at least partially overlaps with the orthographic projection of the at least part of the plurality of signal lines onto the base substrate;
wherein the plurality of second cathode patterns comprise a plurality of first sub-patterns, and adjacent first cathode patterns arranged in a first direction are coupled via at least one first sub-pattern; and
the plurality of signal lines comprises a plurality of data lines, the data line comprises a first data portion and a second data portion alternately arranged in the first direction, an orthographic projection of the first data portion onto the base substrate at least partially overlaps with an orthographic projection of a corresponding first cathode pattern onto the base substrate, and an orthographic projection of the second data portion onto the base substrate at least partially overlaps with an orthographic projection of a corresponding first sub-pattern onto the base substrate; and
the touch-control display device further comprises:
a touch-control layer, wherein the touch-control layer is located on a side of the cathode layer of the display substrate facing away from the base substrate of the display substrate, the touch-control layer comprises touch-control electrodes distributed in an array, and the touch-control electrodes are arranged in a grid.

12. The touch-control display device according to claim 11, wherein an orthographic projection of the touch-control electrode onto the base substrate does not overlap with the orthographic projection of the first cathode pattern in the cathode layer onto the base substrate.

13. The touch-control display device according to claim 11, wherein the touch-control electrode comprises a plurality of first touch-control portions and a plurality of second touch-control portions, at least a part of the first touch-control portion extends in a first direction and at least a part of the second touch-control portion extends in a second direction, the first direction intersects with the second direction.

14. The touch-control display device according to claim 13,
wherein a minimum distance L1 between the orthographic projection of the first cathode pattern onto the base substrate and an orthographic projection of a first touch-control portion adjacent to the first cathode pattern onto the base substrate satisfies: $L1 \geq 0.5 \times d1$, wherein d1 is a width of the first touch-control portion; and/or
a minimum distance L2 between the orthographic projection of the first cathode pattern onto the base substrate and an orthographic projection of a second touch-control portion adjacent to the first cathode pattern onto the base substrate satisfies: $L2 \geq 0.5 \times d2$, wherein d2 is a width of the second touch-control portion.

15. The touch-control display device according to claim 13, wherein an orthographic projection of the first touch-control portion onto the base substrate does not overlap with an orthographic projection of a data line in the display substrate onto the base substrate.

16. The touch-control display device according to claim 3, wherein an orthographic projection of the second touch-control portion onto the base substrate does not overlap with an orthographic projection of a scanning line in the display substrate onto the base substrate.

17. The touch-control display device according to claim 13, wherein the touch-control display device comprises a first area and a second area;
an orthographic projection of the cathode layer onto the base substrate is located within an orthographic projection of the first area onto the base substrate; and
a layout density for first touch-control portions and second touch-control portions in the first area is less than a layout density for first touch-control portions and second touch-control portions in the second area.

18. The touch-control display device according to claim 11, wherein the touch-control display device comprises a transparent touch-control display device.

* * * * *